US010530990B2

(12) United States Patent
Sevin

(10) Patent No.: US 10,530,990 B2
(45) Date of Patent: Jan. 7, 2020

(54) METHOD FOR CONTROLLING A VIDEO-SURVEILLANCE AND CORRESPONDING VIDEO-SURVEILLANCE SYSTEM

(71) Applicant: CANON KABUSHIKI KAISHA, Tokyo (JP)

(72) Inventor: Julien Sevin, Saint Aubin du Cormier (FR)

(73) Assignee: Canon Kabushiki Kaisha, Tokyo (JP)

(*) Notice: Subject to any disclaimer, the term of this patent is extended or adjusted under 35 U.S.C. 154(b) by 184 days.

(21) Appl. No.: 15/493,023

(22) Filed: Apr. 20, 2017

(65) Prior Publication Data

US 2017/0310881 A1 Oct. 26, 2017

(30) Foreign Application Priority Data

Apr. 25, 2016 (GB) .................................. 1607151.6

(51) Int. Cl.
*H04N 5/232* (2006.01)
*H04N 7/18* (2006.01)

(52) U.S. Cl.
CPC ..... *H04N 5/23216* (2013.01); *H04N 5/23293* (2013.01); *H04N 7/181* (2013.01)

(58) Field of Classification Search
CPC . H04N 5/23216; H04N 5/23293; H04N 7/181
See application file for complete search history.

(56) References Cited

U.S. PATENT DOCUMENTS

| 2012/0124629 A1* | 5/2012 | Musick | H04N 21/2402 |
| | | | 725/95 |
| 2016/0330497 A1* | 11/2016 | VanAntwerp | H04N 21/2665 |
| 2016/0352798 A1* | 12/2016 | Becker | H04L 67/42 |

FOREIGN PATENT DOCUMENTS

| WO | 2011/101023 A1 | 8/2011 |
| WO | 2012/154157 A1 | 11/2012 |

OTHER PUBLICATIONS

Patents Act 1977: Search Report under Section 17 for GB patent application No. 1607151.6, dated Sep. 29, 2016.

* cited by examiner

*Primary Examiner* — Maria E Vazquez Colon
(74) *Attorney, Agent, or Firm* — Canon U.S.A., Inc. I.P. Division

(57) ABSTRACT

Embodiments relate to a method for controlling a video-surveillance system processing a plurality of video streams. A set of video streams is processed based on a first configuration. Upon reception of a request for processing a new video stream with requested characteristics, the available resources (network and/or processing resources) are determined. For a requested new video stream that cannot be processed with the available resources, temporary characteristics are determined based on the available resources, the temporary characteristics making it possible to process the new video stream with the available resources. A second configuration for processing the set of video streams including the requested new video stream with the requested characteristics is then determined, and the set of video streams and the new video stream with are processed with the second configuration. Embodiments also relate to a videos surveillance system comprising a processing module configured to process such a method.

25 Claims, 11 Drawing Sheets

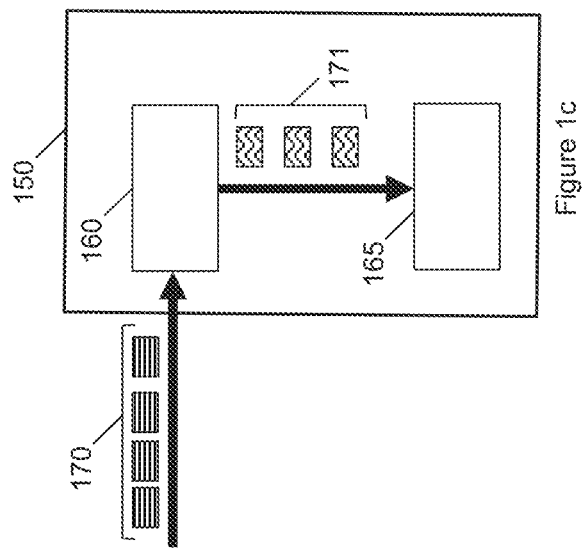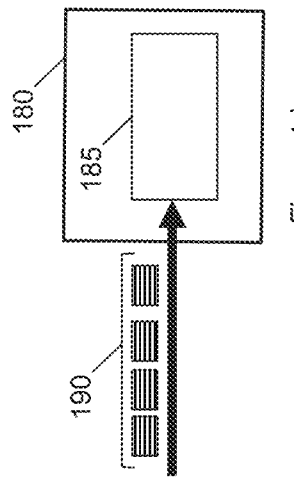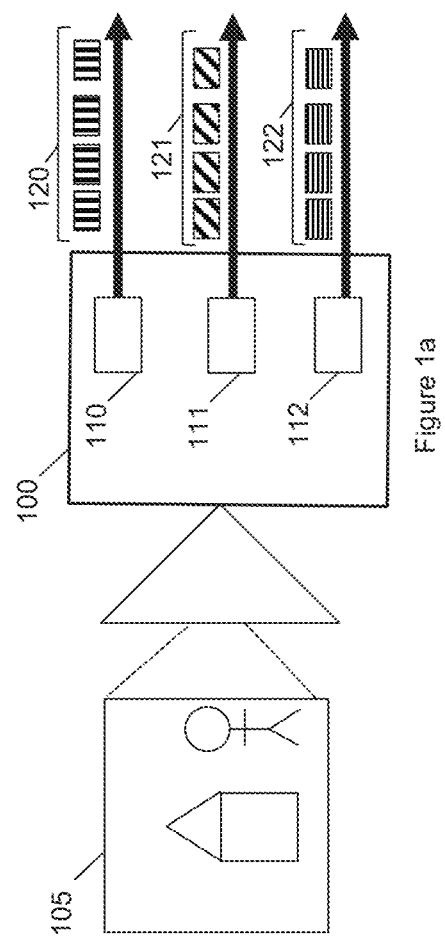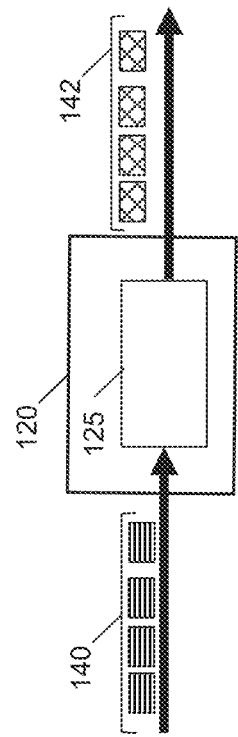

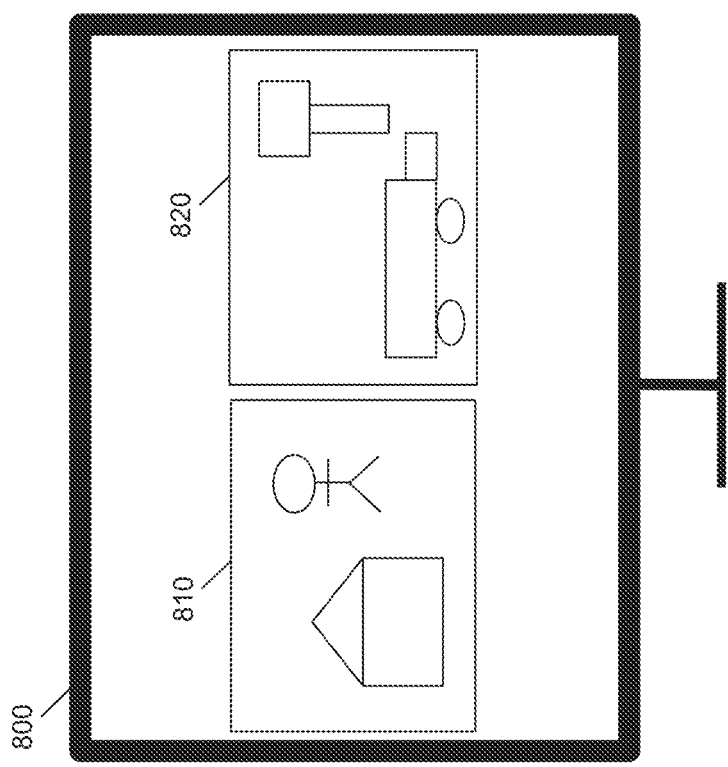

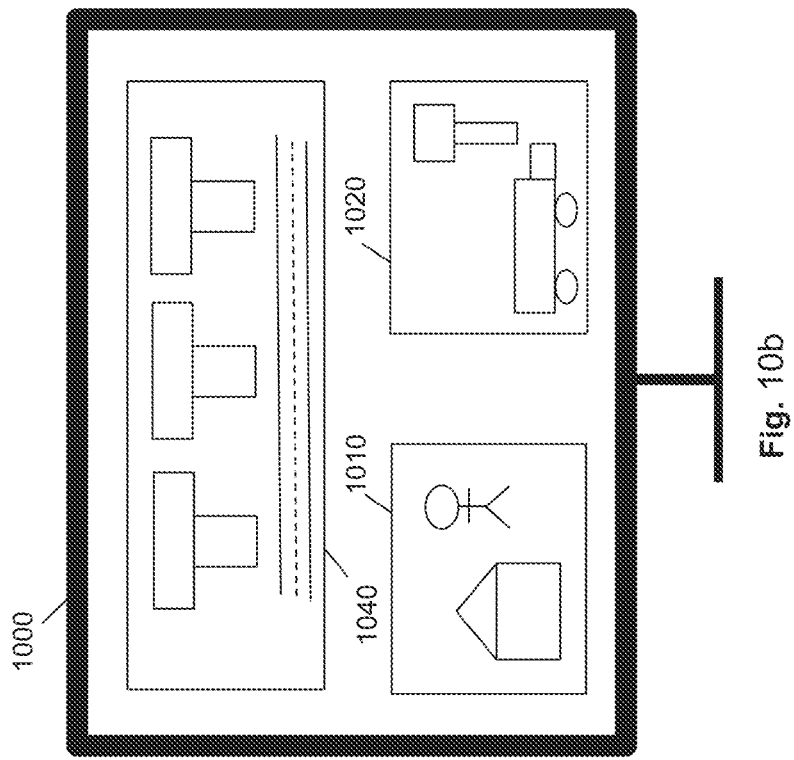
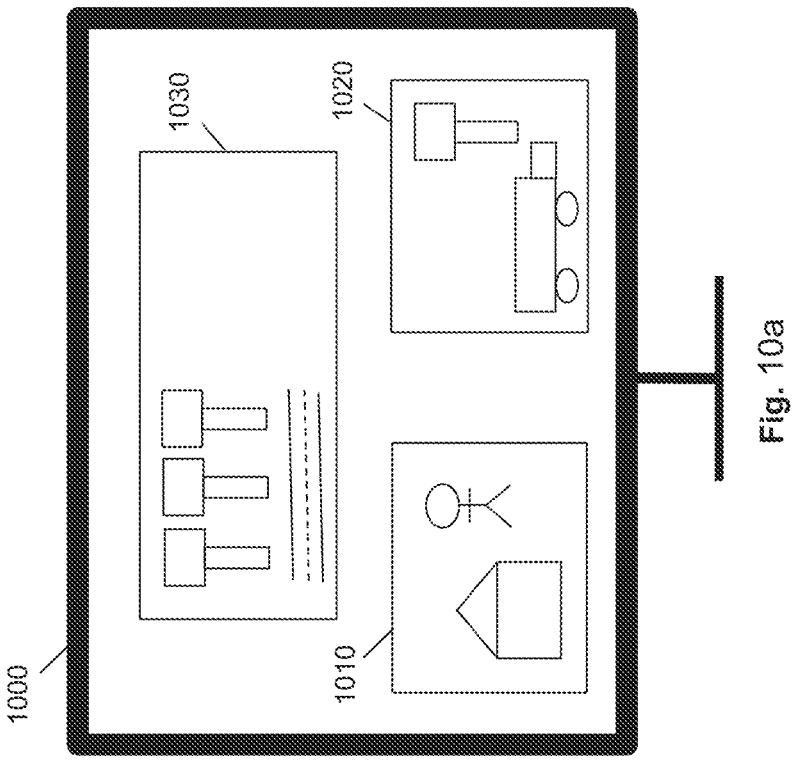

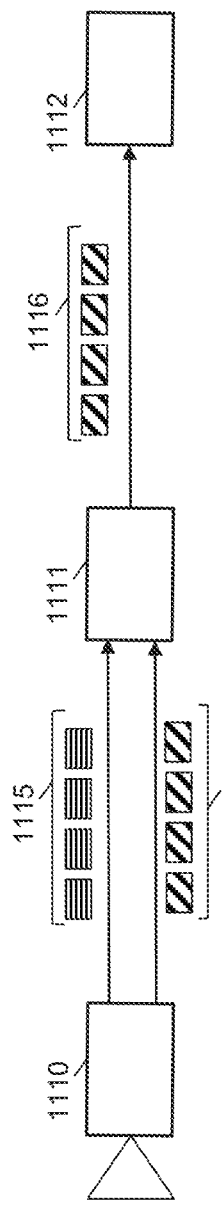
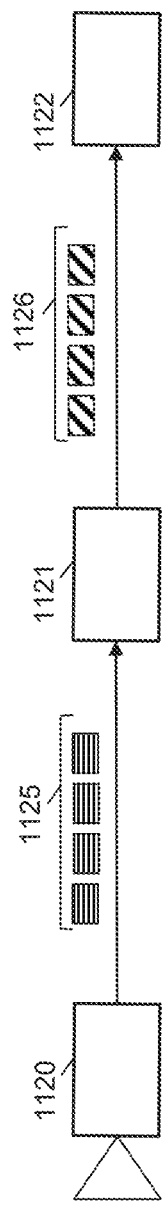
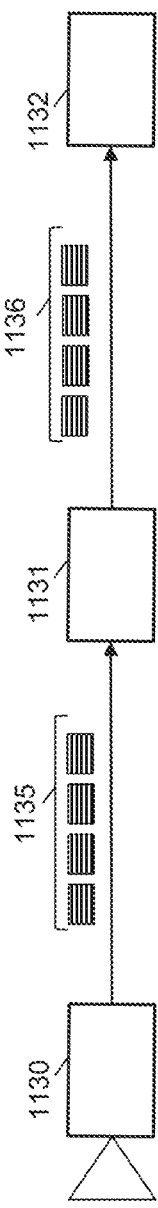
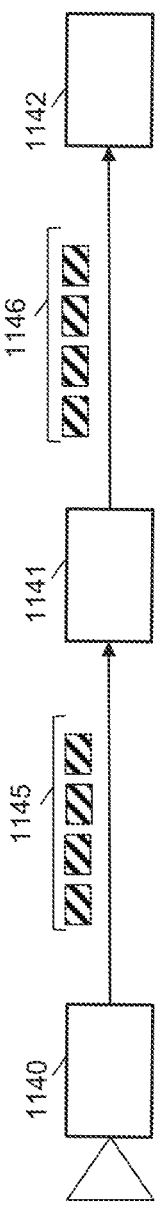

METHOD FOR CONTROLLING A VIDEO-SURVEILLANCE AND CORRESPONDING VIDEO-SURVEILLANCE SYSTEM

CROSS-REFERENCE TO RELATED APPLICATION(S)

This application claims the benefit under 35 U.S.C. § 119(a)-(d) of United Kingdom GB Patent Application No. 1607151.6, filed on Apr. 25, 2016, and entitled "METHOD FOR CONTROLLING A VIDEO-SURVEILLANCE AND CORRESPONDING VIDEO-SURVEILLANCE SYSTEM", which is incorporated by reference herein in its entirety.

FIELD OF THE INVENTION

One or more embodiments of the present disclosure relate to the technical field of video surveillance systems. More particularly, it relates to a method for controlling a video-surveillance system and to a corresponding system for controlling a video surveillance system.

BACKGROUND OF THE INVENTION

A video surveillance system is a system comprising one or many cameras and associated means configured to transmit the video signal (or signals) through a closed circuit to devices to display, record, process, and/or analyze it.

A video surveillance system may have several purposes, such as crime prevention, surveillance of industrial processes, traffic monitoring.

A video surveillance (VS) system has in general two main baseline functions: live viewing and recording (for the retrieval and viewing of video such as for a post-event investigation). Concerning the live viewing, a human person, referred to as operator, monitors one or several cameras, each camera corresponding to a given scene. In addition to these two main functions, there is also a growing use of Video Content Analytics (VCA) algorithms which process and analyze video in order to perform new tasks. For instance, typical VCA algorithms used in a video-surveillance system are face detection or recognition, people tracking, and licence plate reading.

Each function (recording, viewing, VCA processing) may require a same video flow from a same camera (corresponding to a given scene) but with different characteristics. The characteristics of a video stream correspond to a set of parameters such as video encoding algorithm (e.g., MPEG, H264), frame rate, resolution, or compression rate (that can be for example be processed by adapting the quantization step of the video stream).

After processing, the resulting video flow with given characteristics is referred to as a "video stream". A video stream intended for a recording function (implemented in a recording server) is referred to as "recording stream". A video stream intended for a viewing function (implemented in a viewer) is referred to as "viewing stream". A video stream intended for a VCA processing function (implemented in a VCA server) is referred to as "VCA stream". Thus, a set (defined as a non-empty collection of distinct elements) of video streams may be processed from a same video flow.

Each function requires certain video characteristics. These characteristics are referred to as "target characteristics" and are predetermined. This means that if all streams are generated with the target characteristics, the quality of service will be in line with a target quality (corresponding to the minimum quality desired or requested by the user or the destination device or application (e.g., recording server, viewer, VCA server)). This is in particular the case of an application embedded in a VCA server and configured to analyze a stream, for which the analysis requires given video characteristics, such as a minimum image definition or a given frame rate.

A video stream can be generated directly from the camera flow, but also from another video stream by modifying (processing) it in a device of the video-surveillance system. Basically, the generation of the video stream is performed at the initialization of the system but it can be also done on the fly during the use of the video-surveillance system (in operation mode). For instance, an operator who monitors several scenes can decide to watch an additional video flow from a new camera (i.e. to display on a viewer a video flow or stream currently not displayed), or to replace the display of a first scene captured by a first camera by a second scene captured by a second camera. In such a case, a new viewing stream needs to be processed, i.e. generated.

However, a video-surveillance system has limited resources. Resources correspond to the system's available capacities in terms of data processing and network. In particular, the network infrastructure is constrained, each communication link of a communication path having a limited bandwidth. Similarly, each device (such as camera, recording server, VCA server) of the video-surveillance system has limited resources in terms of processing and memory (i.e. limited data storage capacity).

For each video stream to be processed, a video stream strategy has to be determined. Each strategy uses resources: this can be evaluated by a "cost" in terms of resources of said strategy. When the available resources of a video surveillance system are exceeded, some video stream strategies cannot be determined and/or some video streams cannot be generated.

As an example consequence of this case, during operation of a video surveillance system, the system cannot display an additional scene captured by another video-camera due to a lack of available resources of the video-surveillance system, even if it is crucial for the operator to watch this scene.

To solve this issue, it is known to manually re-define the set of video stream strategies relative to all video streams including the requested video stream, taking into account the required quality (and the corresponding required characteristics) for each stream and the resources of the video-surveillance system.

However, this process can be long and during this transition period (period for determining the new configuration, i.e. the new set of strategies), the requested video stream cannot be processed and consequently cannot be displayed (or alternatively recorded, or analyzed).

Definitions

In the present disclosure, the following words or expressions are used as hereafter stated.

A video flow is defined as the video data captured by a video camera in operation. It is formed by a set of consecutive images or frames. Relative to a video stream (as described as follows), a video flow can be considered as raw data (i.e., which is not encoded).

A video stream comprises data which corresponds to the result of the processing of the video flow by an encoding module performing an encoding algorithm which is set with parameters such as a frame rate and/or resolution and/or compression rate.

A video stream strategy is defined as a processing method adapted to generate a video stream with given (predetermined) characteristics. The characteristics of a video stream correspond to a set of parameters such as video encoding standard, frame rate, resolution, or compression rate. The processing method defines the devices to be used for the processing, and data related to the processing to be implemented by said devices.

A configuration is defined as a plurality of video stream strategies applied to a plurality of video streams. In other words, a configuration corresponds to a plurality of processing methods adapted to generate a plurality of video streams with given characteristics. A configuration defines, for each video stream to be processed, at least a part of a path of a communication network over which said video stream is to be transmitted. In particular, the defined part of a path may comprise at least one device, and the configuration comprises the processing to be applied by said device An administrator is the person who configures the video surveillance system. In particular, he sets the required characteristics of all video streams which could be generated in an operation mode in the video surveillance system.

An operator is the person who has to monitor scenes, each scene corresponding to a video flow issued from a given camera. Generally, he can select at any time any scene to watch. However, contrary to the administrator, he cannot modify the characteristics of the flow corresponding to a scene. Typically, when an operator wishes to watch a video generated by a given camera, he receives the video stream having a quality previously set by the administrator.

SUMMARY OF INVENTION

One or more embodiments of the disclosure relate to a method for controlling a video-surveillance system, which makes it possible to define a new configuration for processing a modified set of video streams while optimizing the transition period between the request for modifying the processed video streams set and the implementation of the new configuration.

According to a first aspect of the disclosure, there is provided a method for controlling a video-surveillance system processing a plurality of video streams, the method comprising: processing a set of video streams, the set comprising video streams with modifiable characteristics, the set being processed based on a first configuration; receiving a request for processing a new video stream with requested characteristics, the new video stream not being comprised in the set of video streams; determining the available resources, in terms of network resources and/or processing resources, based on the characteristics of the video streams of the set of video streams; determining that the requested new video stream with the requested characteristics cannot be processed with the available resources; determining, based on the available resources, temporary characteristics for processing the new video stream, without modifying the first configuration, wherein the temporary characteristics are adapted to make it possible to process the new video stream with the available resources; obtaining and processing the new video stream with the temporary characteristics; determining a second configuration for processing the set of video streams including the requested new video stream with the requested characteristics; and, processing the set of video streams and the new video stream with the second configuration.

At least one embodiment of the method according to the disclosure thus makes it possible to optimize the transition period between the request for modifying the processed video streams set and the implementation of the new configuration, by taking the available resources in to account and determine temporary characteristics to be applied during said transition period.

More particularly, determining temporary characteristics makes it possible to process a degraded version of the requested video stream instead of providing nothing to be displayed, recorded or analyzed during the transition period.

In other words, during the transition period, before a second configuration is determined and used to process the video streams (including the requested video stream), the requested video stream may be partially taken into account to ensure a degraded service without delay. More particularly, the requested video stream may be partially taken into account by using degraded characteristics related to the requested video stream.

The first and second configuration may define, for each video stream to be processed according to the configuration, at least a part of a path of a communication network over which said video stream is to be transmitted, said at least part of a path comprising at least one device, and the processing to be applied by said at least one device.

According to an embodiment of the method, determining a second configuration comprises: determining a plurality of possible second configurations; displaying determined second configurations in a graphical user interface enabling a user to interact with and select one of the second configurations from the plurality; and, receiving a request for applying a user-selected second configuration for processing the set of video streams and the new video stream.

In this embodiment of the method, the operator is informed that the video systems system doesn't have enough resources to process all the video streams. It can select for which video streams, the quality of service will be not guaranteed.

According to an alternative embodiment of the method, a priority is associated with each video stream, including the video streams of the set of video streams and the new video stream, wherein determining a second configuration comprises: determining a plurality of possible second configurations; determining a priority for each second configuration of the plurality of second configurations based on the priority of the video streams processed based on that second configuration; and selecting one second configuration of the plurality of second configurations based on the determined priorities of the second configurations.

In this embodiment of the method, the choice of the processed video streams is automatized. In some cases, this is useful for the operator who he is, most of the time, not an expert of the video surveillance system. Moreover, the choice of a first operator can have an impact on the operations of a second distinct operator (which uses/processes/watches another/same video stream which can be degraded by the first operator). Consequently, it may be preferable to let the choice of the processed streams (depending on the requested streams) to the administrator.

In yet another alternative embodiment of the method a priority is associated with each video stream, including the video streams of the set of video streams and the new video stream, wherein determining a second configuration comprises: determining a plurality of possible second configurations; determining a priority for each of the plurality of second configurations based on the priority of the video streams processed based on said second configuration; and, ranking the configurations of the plurality of second configurations based on the priority of the video streams processed based on said second configuration; displaying a lists of ranked second configurations in a graphical user interface enabling a user to interact with and select one of the second configurations among the plurality; and, receiving a request for applying a user-selected configuration for processing the set of video streams and the new video stream.

In this embodiment, the main advantages of an operator choice and of an automatized choice are provided thanks to an ordered configuration list which helps the operator in his choice.

The set of video streams may comprise a first sub-set of video streams with fixed characteristics and a second sub-set of video streams with modifiable characteristics, wherein in each second configuration the fixed characteristics remain unchanged while modified modifiable characteristics are defined for video streams of the second sub-set.

The method may further comprise a prior step of setting predefined characteristics for all possible video streams that can be processed by the video-surveillance system.

The method may comprises a prior step of setting a priority for all video streams having modifiable characteristics that can be processed by the video-surveillance system, the priority being used in the step of determining a second configuration for determining modified characteristics for said streams having modifiable characteristics based on their priority.

The available resources may comprise available network resources and available processing resources. In particular, the available network resources may be modeled by a list of communication links in the video-surveillance system comprising for each link the maximum supported bandwidth of the link minus the sum of the network resources consumed for said link for processing and transmission of the set of video streams. The available processing resources may be modeled by a list of the devices in the video-surveillance system able to generate and process video streams comprising for each device an item of information representing the processing capacity of the device minus the sum of the processing resources consumed for said device for processing the set of video streams.

According to an embodiment of the method, the step of determining that the requested new video stream with requested characteristics cannot be processed with the available resources comprises: determining a resource cost for the new video stream based on the requested characteristics of the request for processing a new video stream; and comparing the resource cost for the new video stream to the available resources.

The step of determining temporary characteristics for processing the new video stream may comprise: obtaining, based on the requested characteristics of the request for processing a new video stream, test characteristics leading to a lower resource cost when the new video stream is processed; generating a request for processing the new video stream with the test characteristics; and determining whether the new video stream with the test characteristics can or cannot to be processed with the available resources, if the new video stream cannot be processed, returning to step a) with the test characteristics as requested characteristics, and if the new video stream can be processed, setting the test characteristics as temporary characteristics.

In such an embodiment, the test characteristics may be obtained by modifying at least one parameter among the frame rate, the resolution, and the compression rate in the requested characteristics of the video stream.

In particular the frame rate and/or the resolution may be decreased, and/or the compression rate may be increased. The modification of a parameter may be decided based on a look-up table indicating for each modification its impact on the quality of the video stream. Modifications may for example be performed successively from the modification having the least impact to the modification having the greatest impact on the quality of the video stream, until the new video stream can be processed with the available resources.

The available resources may advantageously be categorized into types comprising network resources and processing resources, and the at least one parameter modified may be selected depending on the type of available resources.

The step of processing the set of video streams and the new video stream with the second configuration may in particular comprise generating the new video stream with the requested characteristics and either displaying it, recording it, or analyzing its content.

In an embodiment of the method, the request for processing a new video stream comprises: an identifier of the new video stream; a destination device identifier; a function associated with the new video stream; requested characteristics for the new video stream, and an information item defining whether the characteristics are fixed or modifiable; if the requested characteristics are modifiable, a priority information item; and a viewer identifier which identifies the device sending the request.

In embodiments of the disclosure, the graphical user interface is displayed on the device corresponding to the destination device identifier.

One or more embodiments of the disclosure also relate to a method for initializing the configuration of a video-surveillance system comprising a streaming device and a processing module, the streaming device transmitting a plurality of video streams to the processing module, wherein the method uses a method for controlling a video-surveillance system as previously described, wherein the video streams to be processed are considered one after another and a request for processing a new video stream is successively generated for each considered video stream.

One or more embodiments of the disclosure also relate to a video-surveillance system comprising a streaming device and a processing module, the streaming device being configured to transmit a plurality of video streams to the processing module, wherein the processing module is configured to: process a set of video streams, the set comprising video streams with modifiable characteristics, the set being processed based on a first configuration; receive a request for processing a new video stream with requested characteristics, the new video stream being not comprised in the set of video streams; determine the available resources, i.e. network resources and/or processing resources, based on the video streams characteristics of the set of video streams; determine that the requested new video stream with requested characteristics can or not to be processed with the available resources; determine, based on the available resources, temporary characteristics for processing the new video stream, without modifying the first configuration, wherein the temporary characteristics are adapted to make it possible to process the new video stream with the available resources; obtain and process the new video stream with the temporary characteristics; determine a second configuration for processing the set of video streams including the requested new video stream with the requested characteristics; and, process the set of video streams including the new video stream with one of the at least one second configuration.

The processing module may comprise a system analyzer configured to determine the available resources.

The processing module may comprise an auto-setting server configured to determine video stream strategies and to process the video streams with requested characteristics.

The video-surveillance system may comprise a set of recording servers configured to store the received video streams, a set of Video Content Analytics configured to analyze the received video streams and a set of viewers configured to display the received video streams.

One or more embodiments of the disclosure also relate to a computer program comprising instructions for implementing a method for controlling a video-surveillance system as previously described, when loaded and executed by a processor.

One or more embodiments of the disclosure also relate to a non-transitory computer-readable medium, comprising instructions of a computer program for implementing a method for controlling a video-surveillance system as previously described.

BRIEF DESCRIPTION OF THE DRAWINGS

Other particularities and advantages of one or more embodiments of the disclosure will also emerge from the following description.

In the accompanying drawings, given by way of non-limiting examples:

FIG. 1 (which includes FIGS. 1a-1d) includes illustrations of typical video streams in a video surveillance system.

FIG. 8 illustrates a display example which may be generated on a viewer for an operator who monitors several scenes on said viewer.

FIG. 10 (which includes FIGS. 10a-10b) illustrates display examples which may be generated on a viewer, in a transition period and after said transition period, in an embodiment where the selection of a new configuration is automatized.

FIG. 11 (which includes FIGS. 11a-11d) schematically represents examples of generations of two video streams from a given video flow, using various video stream strategies.

DETAILED DESCRIPTION OF EMBODIMENTS OF THE INVENTION

Figure 2:
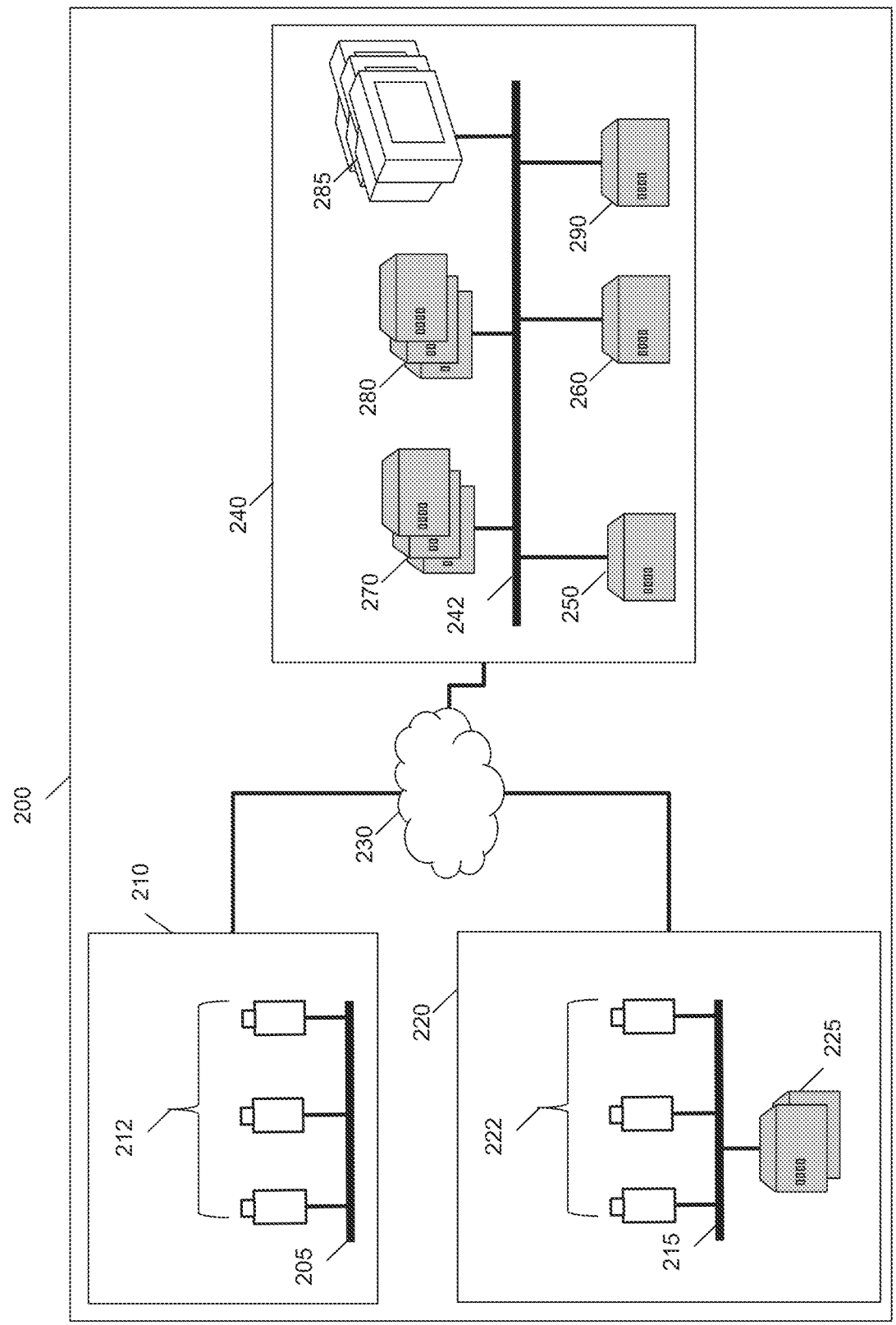
FIG. 2 is a schematic representation of an example of architecture of a video surveillance system.

FIG. 1 represents an illustration of the generation of video streams in a video surveillance system. The represented video surveillance system comprises several devices able to generate and process video streams. FIG. 1 focuses on four of them: a camera 100 in FIG. 1a, a recording server 120 in FIG. 1b, a VCA server 150 in FIG. 1c and a viewer in FIG. 1d.

A video stream strategy can be formalized by a triplet of three fields. The first field corresponds to the type of processing to be performed to generate the video stream. It is referred to as "processing field". The second field corresponds to the identification of a video stream/flow used to generate the video stream. It is referred to as an input stream field. The third field corresponds to a device of the video surveillance system where the generation of the video stream is performed. It is referred to as "location field".

In FIG. 1a, a surveillance video-camera 100 captures a video flow of a given scene 105. The video flow captured may be processed by a set of independent video encoders 110, 111 and 112 embedded in the video-camera 100. Each video encoder is set up according to image parameters such as an encoding algorithm (typically H264 or MJPEG), a frame rate, a resolution, and a compression rate. Each video encoder processes the video flow and generates as output data a "video stream".

The set-up of an encoder depends on the characteristics of the video flow (corresponding to the input data of the encoder) and the characteristics of the video stream (corresponding to the output data of the encoder).

With multiple encoders, independent video streams with different characteristics can be generated simultaneously from the same video flow by the camera 100. This corresponds to a first video stream strategy which is referred to as "camera video stream strategy".

For instance, the encoder 110 generates the video stream 120, the video encoder 111 generates the video stream 121 and the encoder 112 generates the video stream 122.

The three video streams 120, 121 and 122 output from the camera 100 may have different characteristics. Each video stream output by a camera 100 may be addressed to a predetermined device, module or application of the video surveillance system, referred to as "destination device", depending on its function (recording, viewing, VCA processing).

Typically, in a video surveillance system, a destination device may be a recording server, a VCA server or a viewer. A stream destined for a recording server is referred to as "recording stream". A stream intended for a viewing server is referred to as "viewing stream". A stream intended for a VCA server is referred to as "VCA stream".

At camera level, the basic video stream strategy, referred to as "camera video stream strategy", comprises a processing field corresponding to the video encoding algorithm of the video flow with predetermined image parameters, an input stream field set to "null" (no input stream processed outside the camera is used) and a location field set to the identifier of the camera. An example of application of this strategy is given in FIG. 11a which is described hereafter.

In FIG. 1b, a recording server 120 receives an input stream 140 which may be a video flow from a video-camera. The recording server may also receive a VCA or viewing stream. The recording server 120 may be configured to process streams/flows which are not recording streams by using an appropriate video stream strategy to generate a recording stream. Furthermore, a recording server 120 may also generate and output streams of other types such as viewing or VCA streams. Consequently, several video stream strategies can be defined at the recording sever level to process video streams from the different received streams/flows, and generate an output stream 142.

Typically, at a recording server:
A first video stream strategy may be defined to generate a viewing stream with second (target) characteristics by processing a received (input) recording stream which has first characteristics;
A second video stream strategy may be defined to generate a VCA stream with second (target) characteristics by processing a received (input) recording stream with first characteristics. An example of this strategy is given in FIG. 11b which is hereafter described. The second video stream strategy is formalized by a triplet comprising a processing field set to "processing of modification" (from a recording stream to a VCA stream), an input stream field set to "recording stream" and a location field set to the identifier of the recording server;
A third video stream strategy may be defined to generate a recording stream with second (target) characteristics by processing a received (input) VCA stream having first characteristics. An example of application of this strategy is given in FIG. 11d;
A fourth video stream strategy may be defined to generate a viewing stream with second (target) characteristics by processing a received (input) VCA stream with first characteristics. The fourth video stream strategy is formalized by a triplet comprising a processing field set to "processing of modification" (from a VCA stream to a viewing stream), an input stream field set to "VCA stream" and a location field set to the identifier of the recording server;
A fifth video stream strategy may be defined to generate a recording stream with second (target) characteristics by processing a received (input) viewing stream having first characteristics;
A sixth video stream strategy may be defined to generate a VCA stream with second (target) characteristics by processing a received (input) viewing stream with first characteristics. The sixth video stream strategy is formalized by a triplet comprising a processing field set to "processing of modification" (from a viewing stream to a VCA stream), an input stream field set to "viewing stream" and a location field set to the identifier of the recording server.

To perform such video stream strategies, the recording server 120 contains a module 125 able to process a received (input) video stream 140 having first characteristics to generate a (modified) output video stream 142 having second characteristics. The module 125 may perform different operations such as transcoding, reduction of frame rate, reduction of resolution, and modification of the compression rate. These operations may be combined. For instance a second stream with a resolution of 720p and a frame rate of 10 frames per second (fps) may be generated from a first stream with a resolution of 1080p and a frame rate of fps. Each operation (processing for modification) has its own processing/network cost which depends on the type of the operation, the first characteristics of the input stream 140 and the second (target) characteristics of the output stream 142.

In FIG. 1c, a VCA server 150 receives an input stream 190 which may be a VCA stream generated by a recording server. Alternatively, the VCA server may receive a recording or viewing stream that may need to be processed (modified) to generate a VCA stream.

Different types of video stream strategies can be defined at the VCA level to generate a VCA stream 171 from a first stream, to be next analyzed in a core module 165.

Typically, at the recording server:
A first strategy may be defined to generate a VCA stream with second (target) characteristics from a received (input) recording stream with first characteristics. An example this first strategy is represented in FIG. 11c, which is hereafter described. The first video stream strategy can be formalized by a triplet comprising a processing field set to "processing of modification" (from a recording field to a VCA stream), an input stream field set to "recording stream" and a location field set to the identifier of the VCA server.
A second strategy may be defined to generate a VCA stream with second (target) characteristics from a received (input) viewing stream with first characteristics. The video stream strategy can be formalized by a triplet comprising by a processing field set to "processing of modification", an input stream field set to "viewing stream" and a location field set to the identifier of the VCA server.

To perform such video stream strategies, the VCA server 150 contains a module 160 able to process a received input video stream 170 with first characteristics in order to generate a modified stream (a VCA stream 171) with second (target) characteristics. Different operations such as transcoding, reduction of frame rate, reduction of resolution, and modification of the compression rate may be performed by the module 160. These operations may be combined. Once processed, the VCA stream 171 is sent to the core module 165 of the VCA server (embedding the VCA algorithm), which is configured to analyze the VCA stream. Each operation (processing for modification) has its own processing/network cost which depends on the type of the operation, the characteristics of the input stream (170) and above all the target characteristics of the output stream (171). The cost of each operation is assumed to be known or predetermined.

In FIG. 1d a viewer 180 receives an input stream 190 which is a viewing video stream to display. The viewer 180 contains a module 185 which is configured to decode a received video stream in order to re-generate the data flow (that may have been degraded) and to display it.

The plurality of video streams to be generated may be divided in two "sub-sets". A set $S_A$ is a "sub-set" of a set $S_B$, if $S_A$ is "contained" inside $S_B$, that is, all elements of $S_A$ are also elements of $S_B$. $S_A$ and $S_B$ may coincide. A first sub-set of video streams has fixed characteristics and a second sub-set of video streams has modifiable characteristics. The characteristics of the data streams of the first sub-set are predefined target characteristics. The Quality of Service (QoS) relative to the corresponding video streams will thus necessarily be in line with a target quality (corresponding to the minimum quality desired/requested by the user or the destination device (recording server, viewer, VCA server)).

Reducing the characteristics means reducing the frame, the resolution and/or increasing compression.

The characteristics of the data streams of the second sub-set are also initially set to the target characteristics. But, contrary to the first sub-set, these characteristics may be modified ("reduced") in some conditions. In a first case, a maximum authorized degradation (or a minimum quality) can be defined for data streams of the second sub-set, corresponding to the degraded characteristics which can be applied to the data stream offering the lowest quality yet accepted by the administrator. In a second case, no maximum authorized degradation (or no minimum quality) is defined. In such a case, the characteristics may be degraded until the considered stream of the second sub-set is not generated at all.

When characteristics of video streams of the second sub-set are modified, the initially expected quality of service will be not obtained for these video streams.

The interest of modified characteristics may be illustrated by the following example.

A video-surveillance system has generally limited resources. The characteristics of the video stream of the first subset cannot be modified, and the video streams of the first subset have to be generated with these characteristics.

A video stream strategy is thus determined for each video stream of the first sub-set, taking into account the fixed characteristics.

With the remaining resources of the video surveillance system (i.e. available resources when the strategies for processing the first sub-set of video streams are implemented), the video streams of the second-sub-set are considered with their target characteristics. If the resources of the video surveillance system are not sufficient to process the second sub-set of video streams with the target characteristics, the resource cost associated to the video streams of said second sub-set has to be reduced. In other words, some video streams have to be processed with modified characteristics so as to obtain a reduced consumption of the resources.

According to a first embodiment, all streams with modifiable characteristics (e.g. all streams of the second sub-set) are concerned by the reduction of characteristics. Alternatively, in order to select the video streams of the second sub-set that may be involved in the reduction of characteristics, a user priority is associated (by the system administrator, at start-up of the system) with each video stream in order to prioritize it. The video streams with the highest user priority are in this case the last video streams for which a reduction of characteristics is applied. By contrast, the video streams with the lowest user priority are the first video streams for which a reduction of characteristics is applied.

By way of example, a number may be used to prioritize video streams. The highest user priority may be set to "5", the lowest user priority may be set to "1", and the possible user priorities may be 1, 2, 3, 4 and 5. Typically, each user priority of each video stream is fixed by the administrator and is stored for example in a non-volatile memory of a Video Manager System or an auto-setting server.

FIG. 2 is a schematic representation of an example of architecture of a video surveillance system.

In the represented architecture, the video surveillance system 200 is composed of two remote sites 210 and 220, one central site (also called headquarters) 240 and a backbone network 230 which interconnects remote sites and the central site.

The first remote site 210 contains, in the represented example, a set of cameras 212 interconnected by a dedicated infrastructure network 205. The dedicated infrastructure network 205 of the first remote site 210 is typically a Local Area Network (LAN) based on a hierarchical architecture with 10/100/1000 Mbps Gigabit Ethernet, RJ-45 using Ethernet switches. The set 212 contains cameras for example as described in reference to FIG. 1a.

The second remote site 220 contains a set of cameras 222 and a set of recording servers 225 interconnected by a dedicated infrastructure network 215. The dedicated infrastructure network 215 of the second remote site 220 is typically a Local Area Network (LAN) based on hierarchical architecture with 10/100/1000 Mbps Gigabit Ethernet, RJ-45 using Ethernet switches. The set 222 contains cameras for example as described in reference to FIG. 1a. The set 225 contains recording servers for example as described in reference to FIG. 1b.

The set of the recording servers 225 is typically configured to store the video flows of the set of cameras 222.

The central site contains a Video Manager System (VMS) 250 configured to manage the video surveillance system, a system analyzer 260 configured to monitor the resources of the video surveillance system, an auto-setting server 290 configured to determine the video stream strategies, a set of recording server 270 configured to store the received video streams, a set of Video Content Analytics (VCA) 280 configured to analyze the received video streams and a set of viewers 285 configured to display received video streams, all the modules being interconnected by a dedicated infrastructure network 242. The dedicated infrastructure network 242 of the central site is typically a Local Area Network (LAN) based on hierarchical architecture with 10/100/1000 Mbps Gigabit Ethernet, RJ-45 using Ethernet switches.

The network deployment of the video surveillance system represented in FIG. 2 is a non-limiting example of a system which can implement an embodiment of a method according to a first aspect of the disclosure, or that may be configured to form a video surveillance system according to a second aspect of the disclosure.

Embodiments of the disclosure may be used for different types of network deployments. For instance, for a video surveillance system containing a central site and several remote sites 210, the deployment (architecture) is called "centralized deployment" (centralized architecture). For a video surveillance system containing a central site and several remote sites 220, the deployment is called "distributed deployment" (distributed architecture).

The set of recording servers 270 may be configured to store video flows/streams that are not already stored in a remote site. For instance, in the video surveillance system 200, the remote site 210 does not comprise a recording server and consequently, the set of recording servers 270 may be used to record video flows issued from the set of cameras 212. Typically, the set of recording servers 270 receives recording streams, but depending on the video stream strategies selected according to one or more embodiments of the disclosure, it can also receive viewing streams or VCA streams.

The set of VCA servers 280 contains the VCA software modules which are configured to process video flows. Typically, the set of VCA servers 280 receives VCA streams, but depending on the selected and implemented video stream strategies, it can also receive viewing or recording streams.

The Video Manager System 250 is a device containing the software module which configures, controls and manages the video surveillance system. It is may be controlled via an administration interface. In particular, this interface comprises a list of the devices or modules of the video-surveillance system, such as cameras, recording servers and VCA servers. Each device or module may be set up via the interface. The Video Manager System 250 also manages all video streams. For instance, the characteristics of each video stream are set up via the Video Manager System 250. More particularly, the administrator initially configures (i.e. predefines) the target (initial) characteristics for all video streams. Moreover, for each stream, the administrator decides whether the characteristics are fixed or modifiable.

In case of a lack of resources, a method according to one or more embodiments of the disclosure selects and applies temporary characteristics to the video streams with modifiable characteristics. According to a first embodiment, the selection of temporary characteristics is made by an operator after predetermination of several possibilities. According to a second embodiment, the selection and implementation of temporary characteristics is done without interacting with an operator.

When a new video stream is requested, a request, referred to as a "video stream generation request" is sent to the Video Manager System 250. This request comprises the video stream strategy associated to the requested (new) video stream (as predefined by the administrator). Based on it, the Video Manager System 250 manages the video surveillance system in order to generate the requested video stream.

The system analyzer 260 monitors the available resources of the video surveillance system in terms of network and processing. In particular, the system analyzer 260 centralizes the processing resources capacity (maximum supported processing load) of each device. In the same way, it retrieves the network resources capacity (maximum supported bandwidth) of each communication link of the video surveillance system.

The "video stream generation request" may result from a previous request to process a stream (e.g., a viewing request). According to an embodiment, the previous request is launched, via a graphical user interface, by an operator that needs to display a non-displayed scene on a viewer 285.

The auto-setting server 290 may comprise the module implementing a method according to the disclosure. It is described more precisely in FIG. 3.

Figure 3:
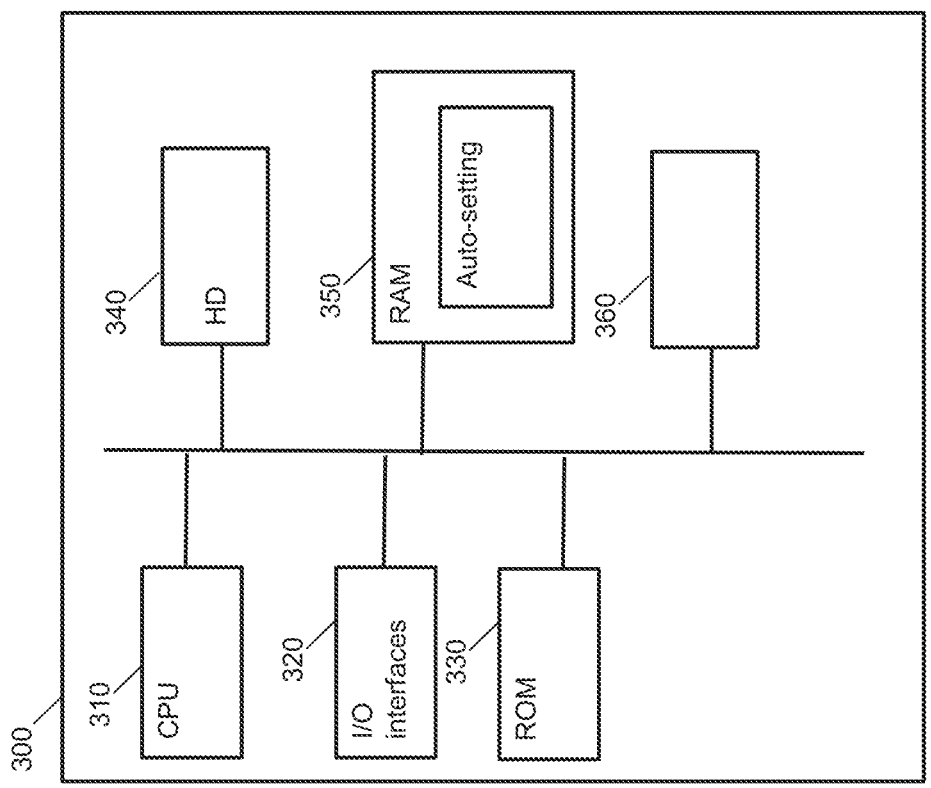
FIG. 3 is a schematic block diagram of a computing device which may be used for implementing one or more embodiments of the disclosure.

FIG. 3 is a schematic block diagram of a computing system adapted for implementing one or more embodiments of the disclosure. It may be embedded in the auto-setting server 290 as shown in the example architecture of FIG. 2. The represented computing device 300 comprises a communication bus connected to:
- a central processing unit 310, such as a microprocessor, denoted CPU;
- an input/output (I/O) module 320 for receiving/sending data, such as a video stream generation request (defined in FIG. 4) and new (video) stream request (defined in FIG. 4), from/to external devices;
- a read only memory 330, denoted ROM, for storing computer programs for implementing embodiments;
- a hard disk 340 denoted HD;
- a random access memory 350, denoted RAM, for storing the executable code of the method of embodiments of the disclosure as well as the registers adapted to record variables and parameters necessary. For instance, the video stream strategies can be stored in 350;
- a communication module 360 is typically connected to a communication network over which digital data to be processed are transmitted or received;
- an interface 360 making it possible to configure input parameters to be used in a method according to the disclosure. The interface 360 may be used by the administrator of the video surveillance system to configure it.

The executable code may be stored either in random access only memory 350 (preferred option), on the hard disk 340 or on a removable digital medium such as for example a disk.

The central processing unit 310 is configured to control and direct the execution of the instructions or portions of software code of the program or programs according to embodiments of the disclosure, which instructions are stored in one of the aforementioned storage means. After powering on, the CPU 310 is capable of executing instructions from main RAM 350 relating to a software application after those instructions have been loaded from the program ROM 330 or the hard-disk (HD) 340 for example.

Figure 4:
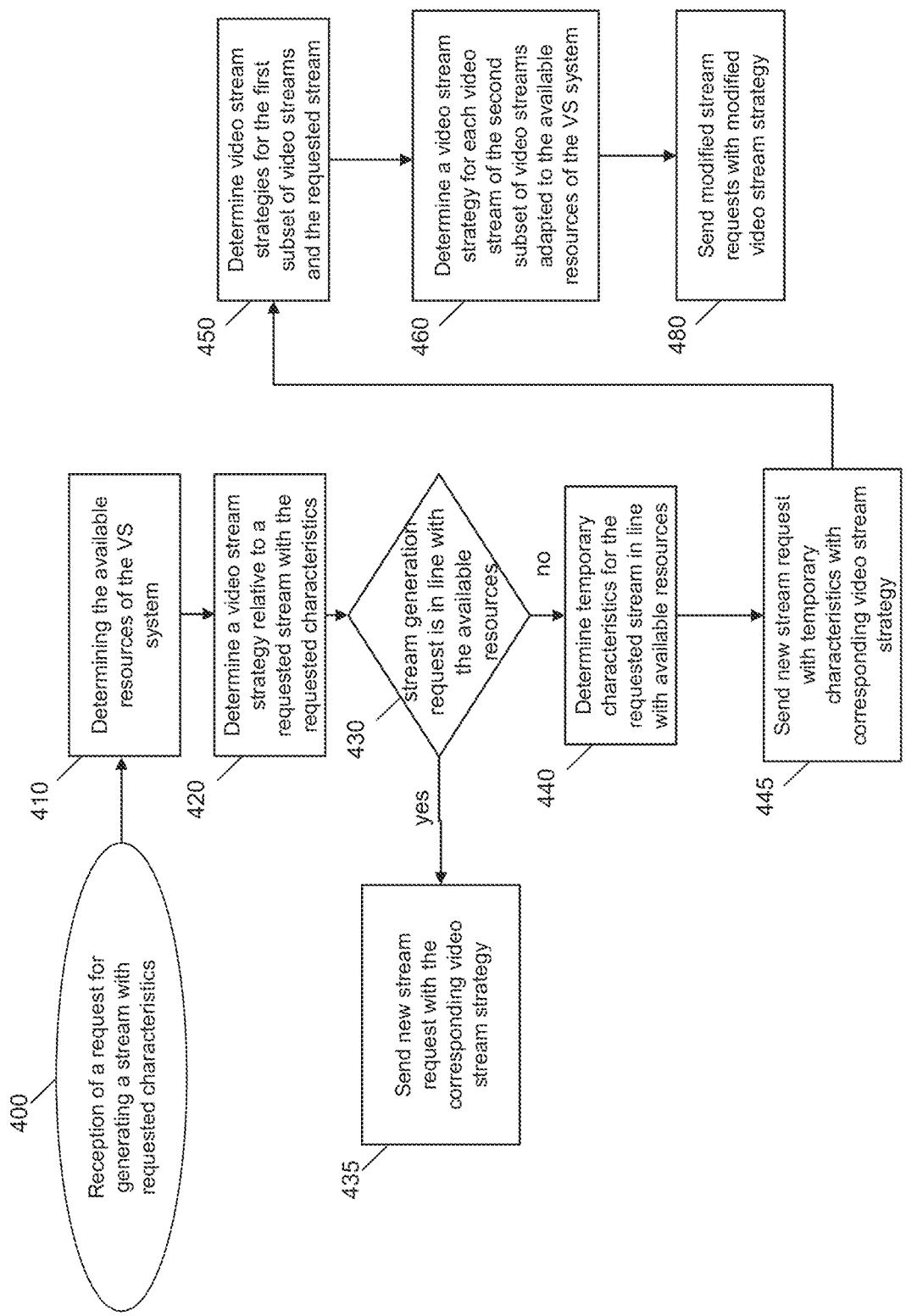
FIG. 4 is a diagram representing the main flowchart of an algorithm used in an embodiment of the disclosure, which makes it possible to re-consider, following a request to generate a new video stream, the set of video stream strategies by taking into account the (requested) quality of the requested stream and the available resources of the video surveillance system.

FIG. 4 is a diagram representing the main flowchart of an algorithm used in an embodiment of the disclosure, which makes it possible to re-consider, following a request to generate a new video stream, the set of video stream strategies by taking into account the (requested) quality of the requested stream and the available resources of the video surveillance system.

The algorithm may be embedded and implemented in the auto-setting server 290, or embedded and implemented in the video manager system 250. According to other embodiments, some steps of the algorithm may be distributed between the Video Manager System 250 and the auto-setting server 290. In such a case, a dedicated communication interface is implemented between the Video Manager System 250 and the auto-setting server 290.

At the reception of a video stream generation request, the algorithm is launched to select a video stream strategy for the requested video stream with requested (e.g. target) characteristics (initial step 400). As a reminder, the characteristics of a video stream may be fixed or modifiable.

When the algorithm of FIG. 4 is used while several streams are currently processed by the video-surveillance system (e.g., not at the initialization of the video-surveillance system as hereafter explained), a set of video streams is already configured with a corresponding "configuration". In other words, a video stream strategy has been selected for each video stream currently processed. The set of stream strategies applied to the video streams is named a "configuration". A configuration may define, for each video stream of the plurality, at least a part of a path of a communication network over which data related to the video stream is to be transmitted, and the processing to be applied by at least one device of the path.

The represented algorithm is configured to determine a video stream strategy adapted to the available resources, so as to process the requested video stream.

The resulting video stream strategy (for the requested stream) is referred to as "requested stream strategy". In a first step, the algorithm tries to apply the requested stream strategy without affecting the current configuration associated to the set of video streams (step 420). If it is not possible due to a lack of resources, the algorithm determines another "requested stream strategy" by adapting the current configuration of the set of video streams (step 460). As a reminder, the set of video streams currently processed may be separated in two sub-sets, a first sub-set containing video streams with fixed characteristics and a second sub-set containing video streams with modifiable characteristics. To determine the "requested stream strategy" the algorithm is configured to only modify the video stream strategies of the second sub-set of video streams, i.e. with modifiable characteristics.

This algorithm may be used when a requested video stream is to be added to the set of video streams that is currently processed. Alternatively, it may be used for initializing the video surveillance system (i.e. when an initial set of video streams has to be configured). In this case, the algorithm illustrated in FIG. 4 is launched several times in order to determine a video stream strategy for each video stream to be generated, one after another. For example, in a video surveillance system wherein all the video flows have to be recorded, it is launched at least n times—n being the number of cameras in the system—in order to determine a video stream strategy for the n recording stream.

The request received at initial step 400, may be sent by an administrator or an operator. Typically, during the configuration or initialization of the video surveillance system, the administrator has to configure the recording and the VCA processing of the video flows.

In operation mode, i.e. when the video surveillance system is operating, the administrator can also decide to add a video stream or to modify the characteristics of a video stream. In such cases, a video stream generation request is generated and sent from the administration interface of the video manager system 250 to the auto-setting server 290 during the configuration of the system.

Moreover, in operation mode, the operator who monitors several scenes, as described with reference to FIG. 8, can decide to watch an additional video flow from a new camera or to replace a watched video flow from a first camera by another flow from a second camera. In such a case, a new viewing stream needs to be generated. The software embedded in the viewer (285) sends a viewing request to the Video Manager System 250. A viewing request indicates the viewer identifier and the flow identifier. The Video Manager System 250 receives the viewing request and generates from it a video stream generation request. Next, the Video Manager System 250 sends the video stream generation request to the auto-setting server 290.

A typical video stream generation request comprises the following information:
- the requested video flow identifier (which corresponds to a camera identifier, which is the identifier of the camera which produces the video flow);
- the destination device identifier;
- the requested function. The destination device identifier has to be in line with the function intended for the considered video flow ("requested function"). The function may be recording, viewing or VCA processing. Depending on the designated function (e.g. the value of a field corresponding to a function in the video stream generation request), the stream to be generated is a recording, a viewing or a VCA stream. This field is optional, in particular if the video surveillance system is configured to determine the function from the destination device identifier;
- the requested characteristics of the requested video stream;
- a variable, e.g. a flag, indicating whether the requested characteristics are modifiable or fixed;
- the user priority of the video stream. This field is not set, if the requested characteristics are fixed. This field is optional when implementing the method illustrated by FIG. 6, but required when implementing the method illustrated by FIG. 7;
- a viewer identifier corresponding to the device which sent the viewing request.

When a video stream generation request is sent from the administration interface of the Video Manager System 250, all the fields of the video stream generation request may be set up by the administrator of the system.

Otherwise, when a video stream generation request is generated and sent based on a viewing request previously received, the fields of the video stream generation request are automatically set up in the following manner:
- The requested video flow identifier of the video stream generation request corresponds to the video flow identifier included in the viewing request.
- The viewer identifier of the video stream generation request corresponds to the device which sent the viewing request.
- The function of the video stream generation request corresponds to viewing.
- The destination device identifier of the video stream generation request corresponds to the destination device identifier included in the viewing request.
- The requested characteristics of the requested video stream of the video stream generation request are already stored in the Video Manager System 250.
- In the same way, the variable of the video stream generation request indicating if its characteristics are modifiable or fixed is already stored in the Video Manager System 250. As a matter of fact, during the initialization of a video surveillance system, the administrator has configured the characteristics of all video streams which can be generated in operation mode.
- Similarly, the user priority of the video stream generation request is already stored in the Video Manager System 250. The administrator has configured (during the initialization of the system) the user priority of all video streams which could be generated in operation mode.

The algorithm represented in FIG. 4 comprises the following steps. First, at step 410 the available resources of the video surveillance system are determined by computing the difference between the capacity of the video surveillance system and the resources consumed by each strategy of the set of video streams currently implemented.

More precisely, implementing a given strategy necessitates network and/or processing resources. The capacity of the video surveillance system corresponds to the entirety of the resources of the system, in terms of network and/or processing. The network capacity of the system corresponds to the network capacity of each communication link, i.e. the maximum bandwidth supported by each link. The processing capacity of the system corresponds to the processing capacity of each device of the system, i.e. the maximum CPU load and/or storage means supported by each device.

The available resources of the video surveillance system may be defined by two lists, namely l1 and l2. The first list l1 corresponds to the available network resources on each communication link of the video surveillance system. The size of the first list l1 is the number of communication links in the video surveillance system. According to an example embodiment, each $i^{th}$ element of l1 corresponds to the $i^{th}$ communication link of the video surveillance system. The $i^{th}$ element is equal to the network capacity of the $i^{th}$ link of the video surveillance system minus the sum of the resources consumed by each strategy of the set of video streams already configured involving the $i^{th}$ link.

The second list l2 corresponds to the available processing resources of each device able to generate and process video streams. The size of l2 is the number of devices able to generate and process video streams in the video surveillance system. Each $j^{th}$ element of l2 corresponds to the $j^{th}$ device of the video surveillance system (able to generate and process video streams). It is equal to the processing capacity of the $j^{th}$ device of the video surveillance minus the sum of the resources consumed by each strategy of the set of video streams already configured involving the $j^{th}$ device.

Step 420 consists in trying to determine a video stream strategy associated to the requested video stream with requested characteristics which is in line with the available resources of the system.

As previously explained, each video stream strategy has a resource cost, that depends on the characteristics of the video stream. Said cost impacts the available resources of the video surveillance system. At the end of the step 420, if no strategy has been determined, the requested strategy is set to a predetermined value (e.g., null).

Next, at step 430 it is checked whether the requested strategy is null or not, to determine if the resources were sufficient to determine a video stream strategy at step 420. If no (the strategy is set to "null"), step 440 is processed. If yes (a strategy has been determined, which may be implemented with the available resources), step 435 is processed.

At step 435 a new stream request is generated and sent to the video manager system and/or other devices. It contains the requested strategy to be applied for the requested video stream. In the present case, it is not necessary to include in the request the requested characteristics of the requested video stream because the video manager system already has this information.

At step 440, temporary characteristics are determined for the requested stream in line with the available resources of the system. Step 440 is described in detail with reference to FIG. 5. At this stage of the algorithm, the data flow and/or processing configuration of the set of the video stream already configured is not affected (modified).

Figure 9A:
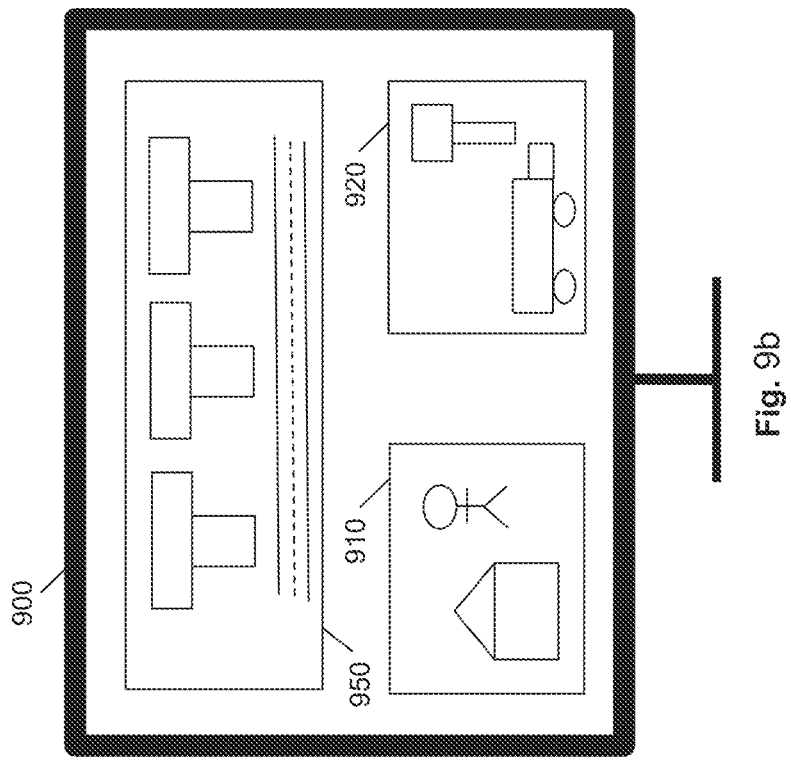
FIG. 9 (which includes FIGS. 9a-9b) illustrates display examples which may be generated on a viewer, in a transition period for the selection by an operator of the new configuration to implement and after said selection.

At Step 445, a new stream request is sent to the video manager system (and/or other devices), said new stream request including temporary characteristics and a corresponding strategy. At this stage, with the sending of the new stream request, the video surveillance system enters in a transition period. Indeed, if the characteristics of the requested video stream are fixed, the request is not (yet) satisfied (since the quality of the stream with temporary characteristics may be lower than the one resulting from the requested characteristics). An example of the result of this step as seen from the operator is shown in FIG. 9a and FIG. 10a.

This transition period makes it possible to display (and/or record, and/or VCA process) a degraded version of the requested stream.

Since step 440 does not affect the video stream strategies previously set (and currently applied), only a single stream request is performed at step 445. In this way, the implementation by the video surveillance system of a transitional configuration including the new strategy may be obtained very quickly.

It should be noted that when the received request is a request to process a stream with modifiable characteristics, only steps 400, 410, 420, 430, 435, 440, 445 may be implemented in the represented embodiment of the disclosure.

At step 450 new video strategies are determined for the first sub-set of video streams (i.e., with fixed characteristics) and for the requested video stream.

To do this, firstly, the available resources are reset. In others words, each element i of l1 is set to the network capacity of the $i^{th}$ link and each element j of l2 is set to the processing capacity of the $j^{th}$ device. Secondly, a video stream generation request is generated for each video stream of the first sub-set and for the requested stream. Thirdly, the steps 410, 420, 430, 440, and 445 are performed successively for each video stream of the first sub-set and for the requested stream. Consequently, at the end of the step 450, a video stream strategy has been selected for each video stream of the first sub-set and for the requested video stream. Furthermore, the available resources of the video surveillance system have been updated (via the lists l1 and l2).

At step 460, new video strategies are determined for the second sub-set of video streams (i.e., with modifiable characteristics). The determined video strategies are adapted to the available resources of the video surveillance system which have been determined at the end of step 450.

Two main embodiments (among other variant embodiments) may then be implemented. A first embodiment is described with reference to FIG. 6, and involves an action (selection of streams) of the administrator or the operator and a second embodiment is described with reference to FIG. 7 and is based on the user priority of each video stream for selection of the streams to process.

At Step 480, the configuration (comprising the strategies determined for the first and second sub-sets of video streams) is sent to the devices concerned of the video surveillance system. In practice, a set of stream requests relative to the requested video stream and to the video streams for which the characteristics and/or the video stream strategy had to be changed by the step 450 or the step 460 is sent to the video manager system or to the other device concerned.

Each stream request comprises the video stream identifier, its corresponding (modified or not) characteristics and its corresponding (modified or not) video stream strategy. An example of application of this step is given with reference to FIG. 9b and FIG. 10b.

Figure 5:
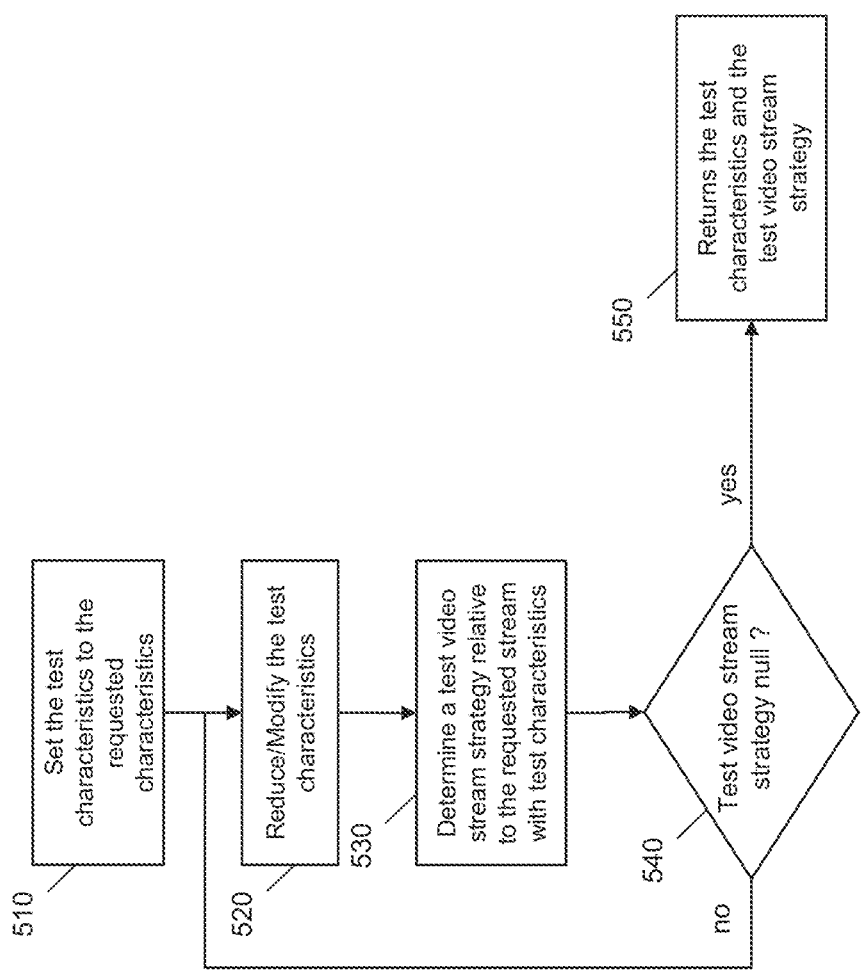
FIG. 5 represents as a flowchart an algorithm which may be implemented in an embodiment of the disclosure to determine temporary characteristics for the requested new stream, taking the available resources of the video surveillance system into account.

FIG. 5 represents, as a block diagram, an algorithm which may be implemented according to an embodiment of the disclosure to determine temporary characteristics for the requested new stream, while taking into account the available resources of the video surveillance system. FIG. 5 corresponds to an embodiment of step 440 of FIG. 4. It consists in finding a video stream strategy which has a cost in line with the available remaining resources of the system. To achieve this, the requested characteristics of the requested stream are reduced (i.e. new characteristics having a lower cost in terms of resources are determined), the reduction consisting in reducing the frame rate and/or reducing resolution and/or modifying the compression rate. With this reduction of one or several characteristics applied to the requested video stream, a video stream strategy with a lower cost can be found, making it possible (when it is possible) to find a video stream strategy in line with the remaining resources of the system.

A first input parameter of the algorithm of FIG. 5 is the requested stream with the requested characteristics (corresponding to the requested characteristics of the requested video stream of the video stream generation request received at step 400 of FIG. 4). A second input parameter of the algorithm is the available resources of the video surveillance system determined at step 410. The algorithm is performed because no strategy could have been determined at step 420 for the requested stream with the requested characteristics according to the remaining resources of the video surveillance system.

At first step 510, a variable referred to as "test characteristics" is configured to correspond to the requested characteristics.

Step 520 is the step where the test characteristics are reduced or more generally modified. Several operations can be performed as a reduction of the frame rate and/or a reduction of the resolution and/or a modification of the compression rate.

According to a first embodiment, the selection of test characteristics results from a predetermination of several possibilities made by an administrator in the video manager system 250. According to a second embodiment, the selection of alternative characteristics is made without interaction with an administrator, and the test characteristics are automatically reduced. From an implementation point of view, a predetermined look-up table is stored in a memory of the video surveillance system which indicates for each operation (reduction of a characteristic) the impact of said operation on the quality of a video flow. Based on said table, the operations are ranked according to the impact on the quality of a video flow and step 520 selects the operation which has the least impact on the quality of a video and has not been yet selected (as described hereafter, the process is iterative, and the listed operations are considered until an appropriate strategy is determined). The next step is step 530.

At step 530, a "test video stream strategy" is determined, relative to a "test video stream" with "test characteristics" selected at step 520, based on the available resources of the video surveillance system (determined at step 410). This step is similar to step 420.

Next, it is checked at step 540 whether the "test requested strategy" is null or not. If yes, the process returns to step 520 (and another operation is considered for reducing the cost in terms of resources, e.g. the next operation in the ranked list of possible operations). If the test requested strategy is not null, step 550 is launched.

Step 550 provides the test characteristics and the corresponding test video stream strategy determined at step 530.

Figure 6:
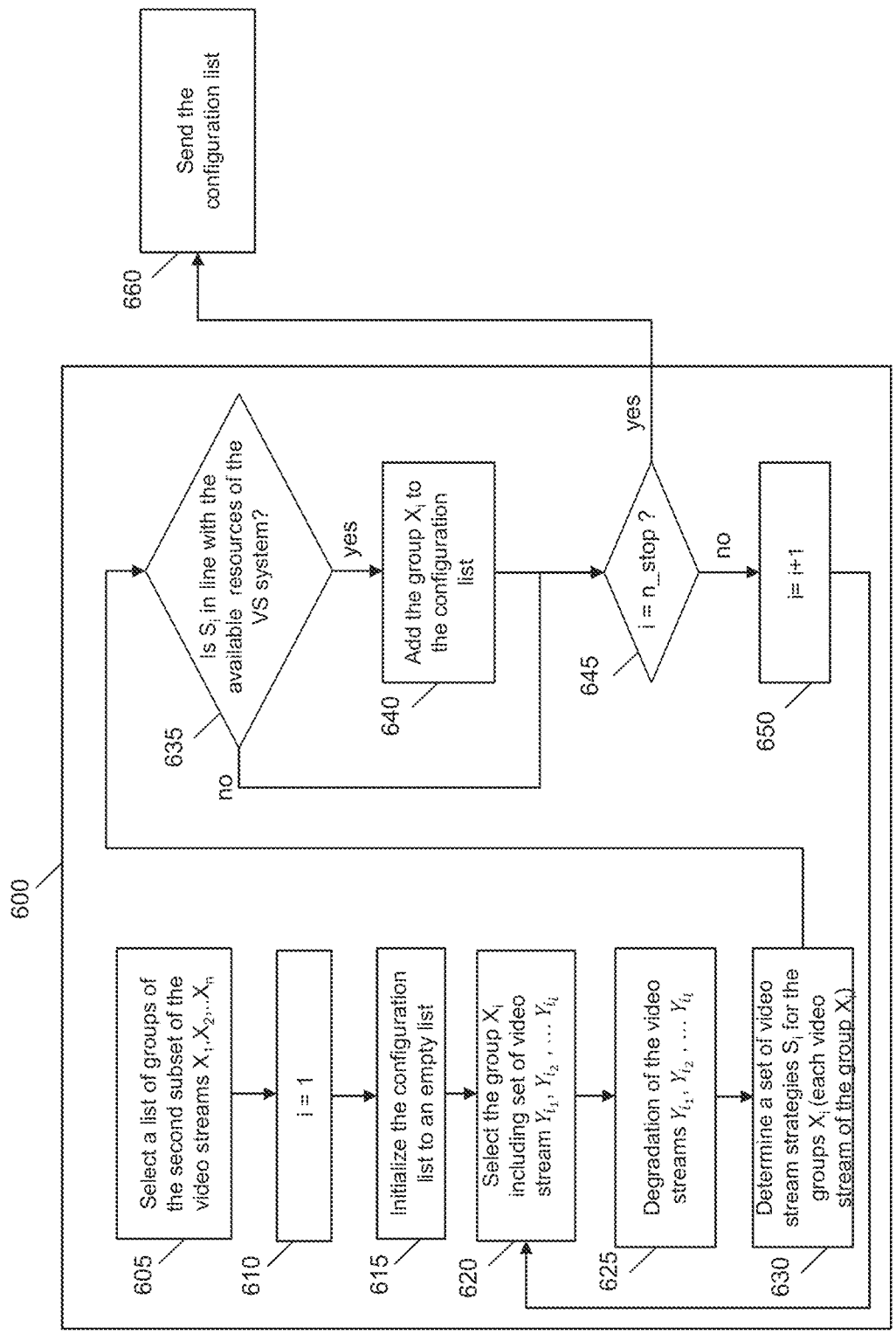
FIG. 6 represents as a flowchart an algorithm which may be implemented in an embodiment of the disclosure to determine new video strategies for video streams having modifiable characteristics, taking the available resources of the video surveillance system into account, and involving a choice of the administrator or the operator.

FIG. 6 represents as a block diagram an algorithm which may be implemented in an embodiment of the disclosure to determine new video strategies for video streams having modifiable characteristics, taking the available resources of the video surveillance system into account, and involving a choice of the administrator or the operator.

An input parameter of the algorithm is the available resources of the video surveillance system determined for example at step 450 of FIG. 4.

First, at step 605 a list of groups of video streams among the second sub-set of the video streams $X_1, X_2, \ldots X_n$ is selected. "n" is the size of the list. The list contains a plurality of the possible groups with 1 video stream, 2 video streams, . . . , n video streams. In a first embodiment, the plurality consists of all the possible combinations of groups. In another embodiment, said plurality is only a predetermined set of all the possible combinations of groups. Moreover, the list may be ordered. This makes it possible not to test all the groups of the list (at step 645, see hereafter). For example, the list may be ordered according to the number of video streams in each group. A group $X_i$ is ranked before a group $X_j$ if the number of video streams in $X_i$ is more than the number of video streams in $X_j$.

At step 610 a variable i (used to count in the iterative process described hereafter) is initialized to zero. At step 615 a list referred to as configuration list is initialized to an empty list. At step 620, the group $X_i$ including the set of video streams $Y_{i_1}, Y_{i_2}, \ldots Y_{i_j}$ is selected.

At step 625 the video streams $Y_{i_1}, Y_{i_2}, \ldots Y_{i_j}$ (of the selected group Xi) which have modifiable characteristics are degraded. For each stream, the degradation may consist in reducing the frame rate and/or reducing resolution and/or modifying the compression rate. The implemented degradation is either predetermined or not. Moreover, one operation (reduction of one characteristic) may be performed, or several operations.

In this case, each considered degradation has to be tested.

It should be recalled that, according to different embodiments, a maximum authorized degradation is defined corresponding to the degraded characteristics which can be applied to the data stream offering the lowest quality acceptable by the administrator, or no maximum authorized degradation is defined. In other words, each degradation corresponds to a new group X to be considered.

Besides, if the list of groups is ordered, if two elements $X_i$ and $X_j$ have the same number of video streams, $X_i$ is ranked before $X_j$ if the degradation applied on $X_i$ has a greater (negative) impact on the quality of the corresponding flows than the degradation applied on $X_j$ (but in terms of resources, $X_i$ as a lower cost than $X_j$).

At step 630, a set of video stream strategies $S_i$ is determined. A strategy is determined for each video stream with the characteristics selected at step 625 according to the available resources of the video surveillance system determined for example at step 450. This step 630 is similar to step 450. If an appropriate video stream strategy is found at step 635 for all video streams of the group Xi, the next processed step is step 640. If not, the next step is step 645.

Step 640 consist in adding the sub-set Xi with the characteristics selected at step 625 to the configuration list and stores the set of video stream strategies of the sub-set Xi. Next step 645 is processed.

At step 645, it is checked whether the algorithm needs to be stopped or not. To do this, a variable n_stop is used. In a first embodiment, n_stop is equal to n, which means that the algorithm is stopped when all the groups Xi have been tested. In a second embodiment, in case the list of sub-sets is ordered, it is possible to stop before all groups have been tested. In this case, n_stop is equal to the maximum number of elements of the list to be tested. Its value is predetermined and may depend for example on a maximum authorized execution time to perform the algorithm. In this way, step 645 checks whether the variable i is equal to the variable n_stop. If yes, the next step is step 660. If not, the next step is step 650.

At step 650, the variable i is incremented by one, and the algorithm returns to step 620.

The steps 605 to 650 constitute the set of steps 600.

Step 660 consists in sending the configuration list to the viewer indicated in the video stream generation request. If the viewer identifier of the video stream generation request is null, the configuration list may be sent to the administration interface of the video manger system 250.

If the viewer identifier of the video stream generation request is not null, the configuration list is sent to the viewer corresponding to the viewer identifier.

Upon reception of the list of configurations, the viewer (or, respectively, the administration interface) displays the list. An application of this step is illustrated with reference to FIG. 9a (see in particular the configuration list 940). Once the list is displayed, the operator (respectively the administrator) selects an element of the list corresponding to a group Xu. The software embedded in the viewer may generate a message which indicates that the choice of the group Xu is acknowledged.

Next, the message which contains the sub-set Xu is received by the addressed device, which may be the viewer, the video manager system interface, etc. The set of video strategies corresponding to the group Xu stored in step 640 is selected, so as to be implemented.

Figure 7:
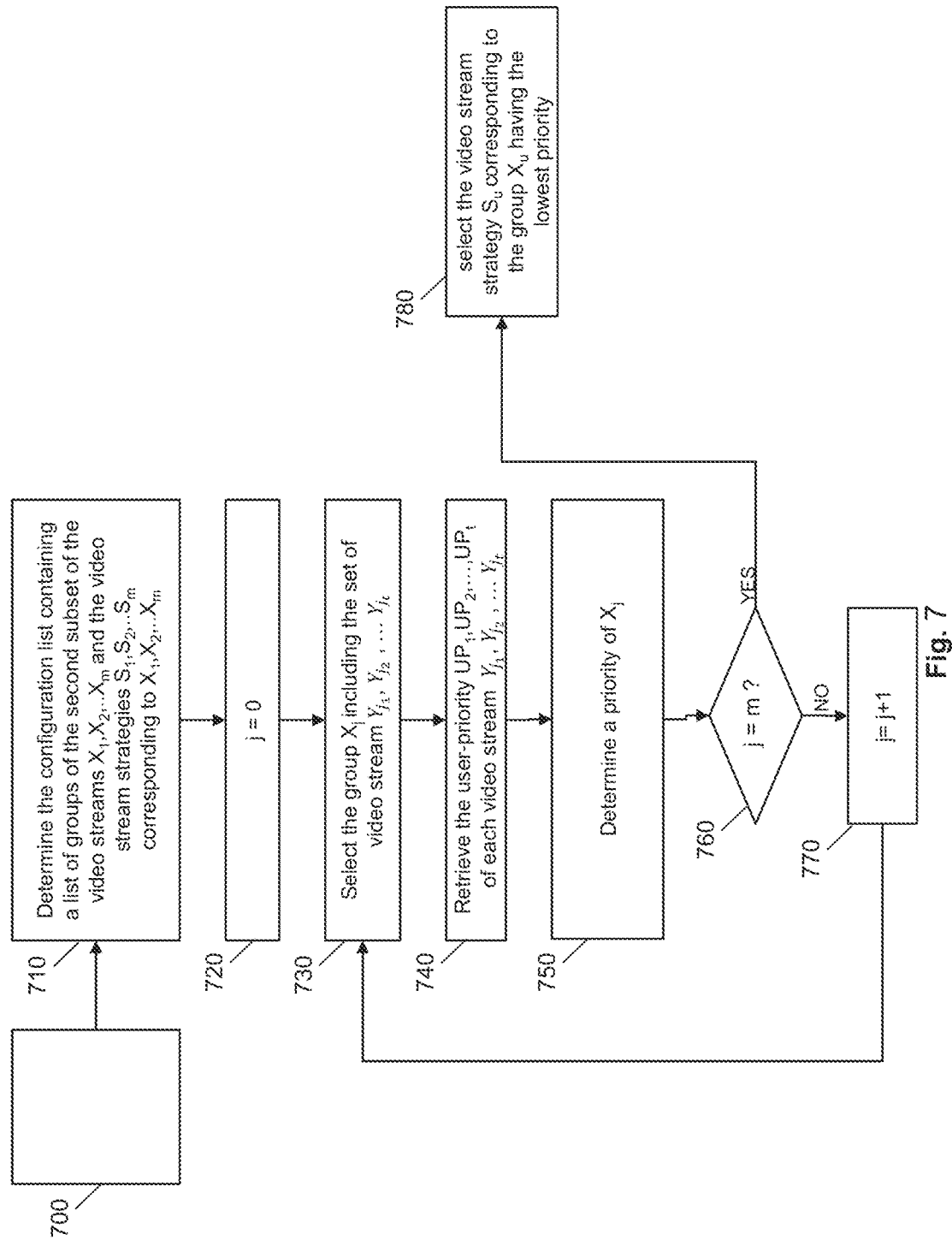
FIG. 7 represents as a flow chart an algorithm which may be implemented in an embodiment of the disclosure to determine new video strategies for video streams having modifiable characteristics, taking the available resources of the video surveillance system into account, and based on predefined user priority of the video stream to automatize the choice of the new strategies.

FIG. 7 represents as a block diagram an algorithm which may be implemented in an embodiment of the disclosure to determine new video strategies for video streams having modifiable characteristics, taking the available resources of the video surveillance system into account, and based on predefined user priority of the video stream to automatize the choice of the new strategies.

More particularly, FIG. 7 describes the algorithm which determines new video strategies for the second sub-set of video streams (modifiable characteristics) adapted to the available resources of the video surveillance system based on the user-priority of the video stream in order to automatize this step.

Step 700 corresponds to the set of steps 600. As a result, a list of configurations is generated, at step 710. It contains a list of groups X1, X2, . . . , Xm of the second sub-set of video streams and the corresponding video stream strategies S1, S2, . . . , Sm.

At step 720 a variable j (used to count in this iterative process) is set to zero.

At step 730, the group $X_j$ including the set of video streams $Y_{j_1}, Y_{j_2}, \ldots Y_{j_t}$ is selected. At step 740 the user-priorities $UP_1, UP_2, \ldots, UP_t$ of each of the video streams $Y_{j_1}, Y_{j_2}, \ldots Y_{j_t}$ are retrieved. The user priorities of the video streams may be stored in the auto setting server 290, for instance in the random access memory 350 and is thus be directly accessible by the algorithm. In another variant embodiment, the user priorities are stored only in the video manager system 250. In that case, the algorithm sends a request to the video manager system 250 in order to obtain the user the user-priorities UP1,UP2, . . . ,UPt.

At step 750, a priority of the group Xi is determined. It is directly a function of the user priorities. For instance, it can be defined by the sum of the user priorities of the video streams $Y_{j_1}, Y_{j_2}, \ldots Y_{j_t}$. It may also be the product of said priorities, or defined by another function of said user priorities.

At step 760 it is checked whether the variable j is equal to m, in other words, whether all the sub-sets Xi have been processed or not. If yes, the step 780 is processed. Otherwise, the step 770 is processed.

Step 770 consists in incrementing the variable j by one, and then the algorithm returns to step 730.

At step 780 the video stream strategy Su is selected, the video stream strategy Su corresponding to the sub-set Xu having the lowest priority determined at step 750.

The principles of the algorithms of FIG. 6 and FIG. 7 may be combined to generate an ordered configuration list. In this way, the list of possible configurations is displayed in an order of preference (for example), helping the user (or the administrator) to choose the configuration to be implemented.

It should be noted that each step of the algorithms shown in FIGS. 4, 5, 6 and 7 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

FIG. 8 illustrates a display example which may be generated on a viewer for an operator who monitors several scenes on said viewer. In the considered example, an operator uses a viewer 800 of the set of viewers 285. A viewer is a device for displaying one or several scenes and optionally other information related to the video surveillance system. The viewer also comprises calculation capabilities and runs software, embedded in said viewer.

The software provides a user interface to watch video flows, live or not live. In the represented example of FIG. 8, the operator watches two video flows 810 and 820. To do this, two viewing streams (corresponding to the two video flows) have to be generated in the video surveillance system.

Figure 9B:
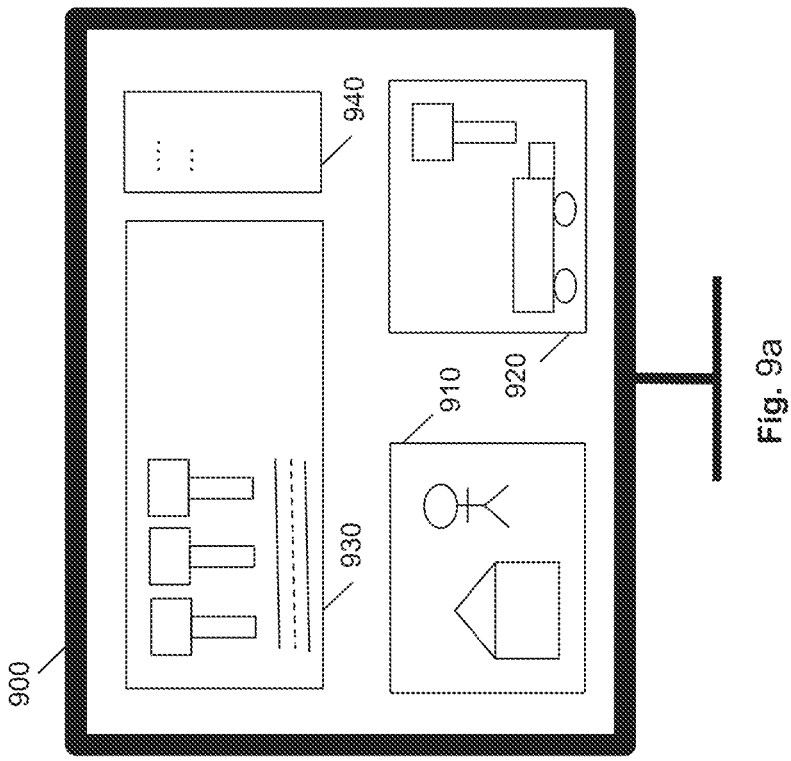

FIG. 9 illustrates a display example which may be generated on a viewer, in a transition period (FIG. 9a) for the selection by an operator of the new configuration to implement and after said selection (FIG. 9b).

The represented display example follows a request of the operator to watch a new flow, and involves the intervention of the operator for the selection of a new configuration.

For example, when an operator monitors several scenes on the viewer as described in FIG. 8, he may want to watch a new scene currently not displayed on the viewer (corresponding to a video flow of another camera). The operator indicates the camera identifier corresponding to the desired scene. Based on this information, the software generates a viewing request including the viewer identifier and the camera identifier corresponding to the desired scene and sends the request to the video manager system 250. The Video Manager System 250 generates a video stream generation request and sends it to the auto-setting server 290, where the algorithm with reference to FIG. 4 is processed.

If no video stream strategy has been found at step 420 (because of a lack of resources), step 440 and step 445 are performed.

As shown in FIG. 9a, at the reception of the new stream request with temporary characteristics, the viewer 900 displays the two previous flows 910 (corresponding to 810) and 920 (corresponding to 820), and the new flow 930 corresponding to the requested stream. The new flow 930 is displayed with the temporary (reduced) characteristics. It is thus displayed with a quality lower than the expected (requested) quality. The expected quality is the quality set up by the administrator during the configuration of the video surveillance system and indicated in the video manager system 250.

Next, the steps 450 and 460 are processed (i.e. in this embodiment the algorithm described with reference to FIG. 6 is processed). Consequently, by step 660, a configuration list is sent by auto-setting server 290 and received by the viewer 900. The viewer 900 displays the configuration list 940. The displayed configuration list contains groups of video streams with degraded characteristics (selected at step 625). According to an embodiment, the viewer can directly display this information. The video surveillance system, and in particular the viewer, enters in a transition period (in which the new stream is displayed with reduced characteristics until a new configuration is ready for display). The operator selects an item of the configuration list corresponding to a group Xu. The software generates a message which confirms the choice of the group Xu. The auto setting server 290 receives the message and selects the video strategies to be implemented. Next, according to step 480 of the algorithm described with reference to FIG. 4 the device sends to the video manager system and/or to other devices a set of stream requests relative to the requested video stream and to the video streams whose characteristics and/or video stream strategy have to be changed. The video manager system sends the corresponding requests to the devices involved and in particular to the viewer 900.

As shown in FIG. 9*b*, the viewer 900 has received a request from the video manager system. The transition period ends. The viewer 900 still displays the video flow 910 and 920 (with unmodified or modified characteristics). The viewer 900 displays the new video flow 950 (corresponding to former video flow 930, but with the expected quality). Moreover, the configuration list 940 is no longer displayed.

FIG. 10 illustrates a display example which may be generated on a viewer, in a transition period (FIG. 10*a*) and after said transition period (FIG. 10*b*) in an embodiment where the selection of a new configuration is automatized. FIG. 10 thus illustrates the results of a process according to an embodiment of the disclosure on the display on a viewer, after a request of the operator to watch a new flow, the process involving no intervention of the operator.

For example, when an operator monitors several scenes on the viewer as described in FIG. 8, he may want to watch a new scene currently not displayed on the viewer (corresponding to a video flow of another camera). The operator indicates the camera identifier corresponding to the desired scene. Based on this information, the software generates a viewing request including the viewer identifier and the camera identifier corresponding to the desired scene and sends the request to the video manager system 250. The Video Manager System 250 generates a video stream generation request and sends it to the auto-setting server 290, where the algorithm with reference to FIG. 4 is processed.

If no video stream strategy has been found at step 420 (because of a lack of resources), step 440 and step 445 are performed.

As shown in FIG. 10*a*, at the reception of the new stream request with temporary characteristics, the viewer 1000 displays the two previous flows 1010 (corresponding to 810) and 1020 (corresponding to 820), and the new flow 1030 corresponding to requested stream. The new flow 1030 is displayed with the temporary (reduced) characteristics. It is thus displayed with a quality lower than the expected (requested) quality. The expected quality is the quality set by the administrator during the configuration of the video surveillance system and indicated in the video manager system 250.

Next, the steps 450 and 460 are processed (i.e. in this embodiment the algorithm described with reference to FIG. 7 is processed). The video surveillance system, and in particular the viewer, enters a so called transition period (in which the new stream is displayed with reduced characteristics until a new configuration is ready for display).

Contrary to the algorithm described in FIG. 6, according to the algorithm described with reference to FIG. 7 no intervention of the operator is required. The algorithm automatically selects the video strategies to be implemented.

Next, according to step 480 of the algorithm described with reference to FIG. 4 the device sends to the video manager system and/or to other devices a set of stream requests relative to the requested video stream and to the video streams whose characteristics and/or video stream strategy had to be changed. The video manager system sends the corresponding requests to the devices involved and in particular to the viewer 1000.

As shown in FIG. 10*b*, the viewer 1000 has received a request from the video manager system. The transition period ends. The viewer 1000 still displays the video flow 1010 and 1020 (with unmodified or modified characteristics). The viewer 1000 displays the new video flow 1040 (corresponding to former video flow 1030, but with the expected quality).

FIG. 11 schematically represents examples of generations of two video streams from a given video flow, using various video stream strategies which define various examples of video stream strategies. This illustrates various contexts in which one or more embodiments of the disclosure may be implemented.

In these examples, only one camera (1110 in FIG. 11*a*, 1120 in FIG. 11*b*, 1130 in FIG. 11*c*, 1140 in FIG. 11*d*) is considered, one recording server (1111 in FIG. 11*a*, 1121 in FIG. 11*b*, 1131 in FIG. 11*c*, 1141 in FIG. 11*d*) and one VCA server (1112 in FIG. 10*a*, 1122 in FIG. 11*b*, 1132 in FIG. 11*c*, 642 in FIG. 11*d*). The camera captures a scene and generates a video flow.

From the video flow generated by the camera, two video streams have to be generated, a recording stream and a VCA stream, each one with predetermined characteristics. In the illustrated videos surveillance system architecture, a stream generated by the camera is first sent to the recording server before reaching the VCA server.

FIG. 11*a* illustrates the application of a so called "camera video stream strategy". Two independent video streams are generated simultaneously with different characteristics by the camera 1110: a recording stream 1115 intended for the recording server 1111 and a VCA stream 1116 intended for the VCA server 1112. The two video streams are received by the recording server 1111. The recording server stores the recording stream 1115 and forwards the VCA stream 1116 to the VCA server 1112. The VCA server receives the VCA stream 1116 and processes it.

FIG. 11*b* illustrates the case where a VCA stream is generated at the recording server with second (target) characteristics, by processing the received recording stream having first characteristics. The camera 1120 generates a recording stream 1125. It is received by the recording server 1121. The recording server duplicates the received recording stream 1121. A first exemplar is stored and a second exemplar is processed in order to generate the VCA stream 1126 with second (target) characteristics. The VCA stream 1126 is sent to the VCA server 1122. The VCA server 1122 receives the VCA stream 1126 and processes it.

FIG. 11*c* illustrates the case where a VCA stream is generated at the VCA server with second (target) characteristics, by processing the received recording stream having first characteristics. The camera 1130 generates a recording stream 1135. It is received by the recording server 1131. The recording server duplicates the received recording stream 1135. A first copy of the recording stream is stored and a second copy 1136 is forwarded directly (no "process of modification" is applied) to the VCA server 1132. The VCA server 1132 receives the recording stream 1136, processes it to generate the VCA stream with second (target) characteristics. Next, it performs the desired analysis on the VCA stream (by the VCA core algorithm).

FIG. 11*d* illustrates the case where a recording stream is generated at the recording server with second (target) characteristics from a received VCA stream having first characteristics. The camera 1140 generates a recording stream 1145. It is received by the recording server 1141. The recording server duplicates the received VCA stream 1145. A first copy 1146 of the VCA stream is forwarded to the VCA server 1142 and a second copy is processed in order to generate the recording stream with second characteristics. This recording stream is stored by the recording server 1141. The VCA server 1142 receives the VCA stream 1146 and processes it.

The method for controlling a video-surveillance system and the corresponding video-surveillance system developed in one or more embodiments of the disclosure thus makes it possible to process a degraded version of a requested video stream during a transition period, when the system lacks resources to process directly the requested video stream with target characteristics. The transition period between the request for modifying the current processed video streams set and the implementation of a new configuration is thus optimized.

The invention claimed is:

1. A method for controlling a video-surveillance system processing a plurality of video streams, the method comprising:
   processing a set of video streams, the set comprising video streams with modifiable characteristics, the set being processed based on a first configuration;
   receiving a request for processing a new video stream with requested characteristics, the new video stream not being comprised in the set of video streams;
   determining available resources, in terms of network resources and/or processing resources, based on the characteristics of the video streams of the set of video streams;
   determining that the requested new video stream with the requested characteristics cannot be processed with the available resources;
   determining, based on the available resources, temporary characteristics for processing the new video stream, without modifying the first configuration, wherein the temporary characteristics are adapted to make it possible to process the new video stream with the available resources;
   obtaining and processing the new video stream with the temporary characteristics;
   determining a second configuration for processing the set of video streams including the requested new video stream with the requested characteristics; and
   processing the set of video streams and the new video stream with the second configuration.

2. The method according to claim 1, wherein each first and second configuration defines, for each video stream to be processed according to the respective configuration, at least a part of a path of a communication network over which the video stream is to be transmitted, the at least part of a path comprising at least one device, and the processing to be applied by the at least one device.

3. The method for controlling a video-surveillance system according to claim 1, wherein, determining a second configuration comprises:
   determining a plurality of possible second configurations;
   displaying determined second configurations in a graphical user interface enabling a user to interact with and select one of the second configurations from the plurality; and
   receiving a request for applying a user-selected second configuration for processing the set of video streams and the new video stream.

4. The method for controlling a video-surveillance system according to claim 1, wherein a priority is associated with each video stream, including the video streams of the set of video streams and the new video stream, wherein determining a second configuration comprises:
   determining a plurality of possible second configurations;
   determining a priority for each second configuration of the plurality of second configurations based on the priority of the video streams processed based on that second configuration; and
   selecting one second configuration of the plurality of second configurations based on the determined priorities of the second configurations.

5. The method for controlling a video-surveillance system according to claim 1, wherein a priority is associated with each video stream, including the video streams of the set of video streams and the new video stream, and wherein determining the second configuration comprises:
   determining a plurality of possible second configurations;
   determining a priority for each of the plurality of second configurations based on the priority of the video streams processed based on the second configuration;
   ranking the configurations of the plurality of second configurations based on the priority of the video streams processed based on the second configuration;
   displaying a lists of ranked second configurations in a graphical user interface enabling a user to interact with and select one of the second configurations among the plurality; and
   receiving a request for applying a user-selected configuration for processing the set of video streams and the new video stream.

6. The method for controlling a video-surveillance system according to claim 1, wherein the set of video streams comprises a first sub-set of video streams with fixed characteristics and a second sub-set of video streams with modifiable characteristics, wherein in each second configuration the fixed characteristics remain unchanged while modified modifiable characteristics are defined for video streams of the second sub-set.

7. The method according to claim 1, further comprising a prior step of setting predefined characteristics for all possible video streams that can be processed by the video-surveillance system.

8. The method for controlling a video-surveillance system according to claim 1, further comprising a prior step of setting a priority for all video streams having modifiable characteristics that can be processed by the video-surveillance system, the priority being used in the step of determining a second configuration for determining modified characteristics for the streams having modifiable characteristics based on their priority.

9. The method for controlling a video-surveillance system according to claim 1, wherein the available resources comprise available network resources and available processing resources.

10. The method for controlling a video-surveillance system according to claim 9, wherein the available network resources are modeled by a list of communication links in the video-surveillance system comprising for each link a maximum supported bandwidth of the link minus a sum of the network resources consumed for the link for processing and transmission of the set of video streams.

11. The method according to claim 9, wherein the available processing resources are modeled by a list of the devices in the video-surveillance system able to generate and process video streams comprising for each device an item of information representing a processing capacity of the device minus a sum of the processing resources consumed for the device for processing the set of video streams.

12. The method for controlling a video-surveillance system according to claim 1, wherein determining that the requested new video stream with requested characteristics cannot be processed with the available resources comprises:
   determining a resource cost for the new video stream based on the requested characteristics of the request for processing a new video stream; and
   comparing the resource cost for the new video stream to the available resources.

13. The method for controlling a video-surveillance system according to claim 1, wherein determining temporary characteristics for processing the new video stream comprises:
   a) obtaining, based on the requested characteristics of the request for processing a new video stream, test characteristics leading to a lower resource cost when the new video stream is processed,
   b) generating a request for processing the new video stream with the test characteristics,
   c) determining whether the new video stream with the test characteristics can or cannot be processed with the available resources, and
   d) in a case where the new video stream cannot be processed, returning to step a) with the test characteristics as requested characteristics, and in a case where the new video stream can be processed, setting the test characteristics as temporary characteristics.

14. The method for controlling a video-surveillance system according to claim 13, wherein the test characteristics are obtained by modifying at least one parameter among a frame rate, a resolution, and a compression rate in the requested characteristics of the video stream.

15. The method for controlling a video-surveillance system according to claim 14, wherein the modification of a parameter is decided based on a look-up table indicating for each modification its impact on a quality of the video stream.

16. The method for controlling a video-surveillance system according to claim 15, wherein modifications are performed successively from a modification having a least impact on the quality of the video stream to a modification having a greatest impact on the quality of the video stream, until the new video stream can be processed with the available resources.

17. The method for controlling a video-surveillance system according to claim 14, wherein the available resources are categorized into types comprising network resources and processing resources, and wherein the at least one parameter modified is selected depending on the type of available resources.

18. The method for controlling a video-surveillance system according to claim 1, wherein the step of processing the set of video streams and the new video stream with the second configuration comprises generating the new video stream with the requested characteristics and either displaying it, recording it, or analyzing its content.

19. The method for controlling a video-surveillance system according to claim 1, wherein the request for processing a new video stream comprises:
   an identifier of the new video stream;
   a destination device identifier;
   a function associated with the new video stream;
   the requested characteristics for the new video stream, and
   an information item defining whether the characteristics are fixed or modifiable;
   if the requested characteristics are modifiable, a priority information item; and
   a viewer identifier which identifies a device sending the request.

20. A method for initializing a configuration of a video-surveillance system comprising a streaming device and a processing module, the streaming device transmitting a plurality of video streams to the processing module,
   wherein the method uses a method for controlling a video-surveillance system according to claim 1, and wherein the video streams to be processed are considered one after another and the request for processing a new video stream is successively generated for each considered video stream.

21. A non-transitory computer-readable medium storing instructions of a computer program for causing a computer to implement a method for controlling a video-surveillance system according to claim 1.

22. A video-surveillance system comprising a streaming device and a processing module, the streaming device being configured to transmit a plurality of video streams to the processing module, wherein the processing module is configured to:
   process a set of video streams, the set comprising video streams with modifiable characteristics, the set being processed based on a first configuration;
   receive a request for processing a new video stream with requested characteristics, the new video stream being not comprised in the set of video streams;
   determine available resources, including network resources and/or processing resources, based on the video streams characteristics of the set of video streams;
   determine that the requested new video stream with requested characteristics can or cannot be processed with the available resources;
   determine, based on the available resources, temporary characteristics for processing the new video stream, without modifying the first configuration, wherein the temporary characteristics are adapted to make it possible to process the new video stream with the available resources;
   obtain and process the new video stream with the temporary characteristics;
   determine at least one second configuration for processing the set of video streams including the requested new video stream with the requested characteristics; and
   process the set of video streams including the new video stream with one of the at least one second configuration.

23. The video-surveillance system according to claim 22, wherein the processing module comprises a system analyser configured to determine the available resources.

24. The video-surveillance system according to claim 22, wherein the processing module comprises an auto-setting server configured to determine video stream strategies and to process one or more video streams with requested characteristics.

25. The video-surveillance system according to claim 22, further comprising a set of recording servers configured to store the received video streams, a set of Video Content Analytics configured to analyse the received video streams and a set of viewers configured to display the received video streams.

* * * * *